United States Patent
Moore et al.

(10) Patent No.: US 9,043,212 B2
(45) Date of Patent: *May 26, 2015

(54) MESSAGING RESPONSE SYSTEM PROVIDING TRANSLATION AND CONVERSION WRITTEN LANGUAGE INTO DIFFERENT SPOKEN LANGUAGE

(75) Inventors: Richard G. Moore, Cedar Rapids, IA (US); Gregory L. Mumford, Marion, IA (US); Duraisamy Gunasekar, Cedar Rapids, IA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1577 days.

This patent is subject to a terminal disclaimer.

(21) Appl. No.: 10/404,111

(22) Filed: Apr. 2, 2003

(65) Prior Publication Data

US 2004/0003041 A1   Jan. 1, 2004

Related U.S. Application Data

(60) Provisional application No. 60/369,271, filed on Apr. 2, 2002.

(51) Int. Cl.
*G06F 17/28* (2006.01)
*H04M 15/00* (2006.01)
(Continued)

(52) U.S. Cl.
CPC ........ *H04M 15/7655* (2013.01); *H04M 7/0045* (2013.01); *H04M 7/0048* (2013.01);
(Continued)

(58) Field of Classification Search
CPC ............ H04M 7/0045; H04M 7/0048; H04M 7/0051; H04M 2203/4536; H04M 2215/8137; H04N 21/234336; H04N 21/440236; H04N 21/2335; H04N 21/234309; H04L 67/2823; G06F 17/28; G06F 17/289
USPC ......... 709/227, 228, 238, 233, 206, 207, 229, 709/226; 370/260, 353, 338, 335; 379/52; 455/414; 704/270.1, 2, 3, 8, 277
See application file for complete search history.

(56) References Cited

U.S. PATENT DOCUMENTS

| | | |
|---|---|---|
| 5,740,230 A | 4/1998 | Vaudreuil |
| 5,809,128 A | 9/1998 | McMullin |

(Continued)

FOREIGN PATENT DOCUMENTS

| | | |
|---|---|---|
| CA | 2441752 | 9/2002 |
| EP | 0978983 | 2/2000 |

(Continued)

OTHER PUBLICATIONS

Steul. D., "Redeining the Call Center: Customer Service on the Internet", Alcatel Telecommunications Review, Alcatel, Paris Cedex, France, 2000.

(Continued)

*Primary Examiner* — Le H Luu

(57) ABSTRACT

A messaging response system is disclosed wherein a service providing system provides services to users via messaging communications. In accordance with an exemplary embodiment of the present invention, multiple respondents servicing users through messaging communications may appear to simultaneously use a common "screen name" identifier.

197 Claims, 11 Drawing Sheets

(51) Int. Cl.

| | | |
|---|---|---|
| *H04M 7/00* | (2006.01) | |
| *H04N 21/2343* | (2011.01) | |
| *H04N 21/4402* | (2011.01) | |
| *H04N 21/233* | (2011.01) | |
| *H04L 29/08* | (2006.01) | |
| *G06Q 20/08* | (2012.01) | |
| *G10L 13/04* | (2013.01) | |
| *G10L 15/26* | (2006.01) | |
| *H04L 12/14* | (2006.01) | |
| *H04L 12/18* | (2006.01) | |
| *H04L 12/58* | (2006.01) | |
| *H04L 29/06* | (2006.01) | |
| *H04L 12/725* | (2013.01) | |
| *H04M 3/42* | (2006.01) | |
| *H04M 3/46* | (2006.01) | |
| *H04M 3/53* | (2006.01) | |
| *H04M 15/08* | (2006.01) | |
| *H04M 17/00* | (2006.01) | |
| *G06Q 20/40* | (2012.01) | |
| *G10L 13/00* | (2006.01) | |
| *H04M 3/493* | (2006.01) | |
| *H04M 3/533* | (2006.01) | |
| *H04M 7/12* | (2006.01) | |

(52) U.S. Cl.
CPC ..... *H04M7/0051* (2013.01); *H04N 21/234336* (2013.01); *H04N 21/440236* (2013.01); *H04N 21/2335* (2013.01); *H04N 21/234309* (2013.01); *H04L 67/2823* (2013.01); *G06F 17/28* (2013.01); *G06F 17/289* (2013.01); *G06Q 20/085* (2013.01); *G10L 13/043* (2013.01); *G10L 15/265* (2013.01); *H04L 12/14* (2013.01); *H04L 12/1403* (2013.01); *H04L 12/1813* (2013.01); *H04L 12/1822* (2013.01); *H04L 12/1827* (2013.01); *H04L 12/58* (2013.01); *H04L 12/581* (2013.01); *H04L 12/5835* (2013.01); *H04L 12/589* (2013.01); *H04L 29/06* (2013.01); *H04L 29/06027* (2013.01); *H04L 45/308* (2013.01); *H04L 51/04* (2013.01); *H04L 51/066* (2013.01); *H04L 51/36* (2013.01); *H04M 3/42127* (2013.01); *H04M 3/42229* (2013.01); *H04M 3/46* (2013.01); *H04M 3/465* (2013.01); *H04M 3/4931* (2013.01); *H04M 3/5322* (2013.01); *H04M 3/533* (2013.01); *H04M 3/53308* (2013.01); *H04M 7/0003* (2013.01); *H04M 7/12* (2013.01); *H04M 15/00* (2013.01); *H04M 15/07* (2013.01); *H04M 15/08* (2013.01); *H04M 15/09* (2013.01); *H04M 15/51* (2013.01); *H04M 15/55* (2013.01); *H04M 15/56* (2013.01); *H04M 15/57* (2013.01); *H04M 15/63* (2013.01); *H04M 15/77* (2013.01); *H04M 15/772* (2013.01); *H04M 15/8292* (2013.01); *H04M 15/83* (2013.01); *H04M 17/00* (2013.01); *H04M 2201/60* (2013.01); *H04M 2203/2066* (2013.01); *H04M 2203/4509* (2013.01); *H04M 2203/4536* (2013.01); *H04M 2215/202* (2013.01); *H04M 2215/208* (2013.01); *H04M 2215/44* (2013.01); *H04M 2215/54* (2013.01); *H04M 2215/62* (2013.01); *H04M 2215/64* (2013.01); *H04M 2215/66* (2013.01); *H04M 2215/725* (2013.01); *H04M 2215/7254* (2013.01); *H04M 2215/7263* (2013.01); *H04M 2215/82* (2013.01); *H04M 2242/30* (2013.01); *H04L 65/1006* (2013.01); *H04L 65/1016* (2013.01); *H04L 65/1069* (2013.01); *H04L 65/80* (2013.01); *H04L 65/4007* (2013.01); *H04L 67/24* (2013.01); *H04L 67/14* (2013.01); *H04L 69/08* (2013.01); *H04L 69/329* (2013.01); *G06Q 20/40* (2013.01); *H04M 7/003* (2013.01); *G10L 13/00* (2013.01); *G10L 15/26* (2013.01)

(56) References Cited

U.S. PATENT DOCUMENTS

| | | | |
|---|---|---|---|
| 5,818,836 | A | 10/1998 | Duval |
| 5,845,267 | A | 12/1998 | Ronen |
| 5,848,134 | A | 12/1998 | Sekiguchi et al. |
| 5,884,266 | A | 3/1999 | Dvorak |
| 5,907,677 | A | 5/1999 | Glenn et al. |
| 5,930,344 | A | 7/1999 | Relyea et al. |
| 5,941,947 | A | 8/1999 | Brown et al. |
| 5,951,694 | A | 9/1999 | Choquier et al. |
| 5,963,217 | A | 10/1999 | Grayson et al. |
| 5,978,669 | A | 11/1999 | Sanmugam |
| 6,011,837 | A | 1/2000 | Malik |
| 6,029,195 | A | 2/2000 | Herz |
| 6,064,723 | A | 5/2000 | Cohn et al. |
| 6,076,100 | A | 6/2000 | Cottrille et al. |
| 6,078,583 | A | 6/2000 | Takahara et al. |
| 6,101,473 | A | 8/2000 | Scott et al. |
| 6,128,601 | A | 10/2000 | Van Horne et al. |
| 6,161,082 | A * | 12/2000 | Goldberg et al. ............... 704/3 |
| 6,173,250 | B1 | 1/2001 | Jong |
| 6,175,619 | B1 | 1/2001 | Desimone |
| 6,175,819 | B1 | 1/2001 | Van Alstine |
| 6,188,761 | B1 | 2/2001 | Dickerman et al. |
| 6,199,114 | B1 | 3/2001 | White et al. |
| 6,219,646 | B1 | 4/2001 | Cherny |
| 6,226,364 | B1 | 5/2001 | O'Neill |
| 6,226,366 | B1 | 5/2001 | Bala et al. |
| 6,243,445 | B1 | 6/2001 | Begeja et al. |
| 6,243,450 | B1 | 6/2001 | Jansen et al. |
| 6,252,869 | B1 | 6/2001 | Silverman |
| 6,252,952 | B1 | 6/2001 | Kung et al. |
| 6,263,072 | B1 | 7/2001 | Booton |
| 6,266,401 | B1 | 7/2001 | Marchbanks et al. |
| 6,269,336 | B1 | 7/2001 | Ladd et al. |
| 6,282,275 | B1 | 8/2001 | Gurbani et al. |
| 6,285,749 | B1 | 9/2001 | Manto |
| 6,301,609 | B1 | 10/2001 | Aravamudan et al. |
| 6,314,178 | B1 | 11/2001 | Walker et al. |
| 6,337,858 | B1 | 1/2002 | Petty et al. |
| 6,373,817 | B1 | 4/2002 | Kung et al. |
| 6,374,224 | B1 | 4/2002 | Horiguchi et al. |
| 6,377,938 | B1 | 4/2002 | Block et al. |
| 6,385,729 | B1 | 5/2002 | DiGiorgio et al. |
| 6,389,114 | B1 | 5/2002 | Dowens et al. |
| 6,389,398 | B1 | 5/2002 | Lustgaten et al. |
| 6,393,113 | B1 | 5/2002 | Karras |
| 6,393,412 | B1 | 5/2002 | Deep |
| 6,393,461 | B1 | 5/2002 | Okada et al. |
| 6,430,602 | B1 | 8/2002 | Kay et al. |
| 6,453,294 | B1 | 9/2002 | Dutta et al. |
| 6,539,218 | B2 | 3/2003 | Higuchi et al. |
| 6,564,261 | B1 | 5/2003 | Gudjonsson |
| 6,600,733 | B2 | 7/2003 | Deng |
| 6,606,644 | B1 | 8/2003 | Ford et al. |
| 6,618,704 | B2 | 9/2003 | Kanevsky et al. |
| 6,651,086 | B1 | 11/2003 | Manber et al. |
| 6,658,246 | B1 | 12/2003 | Helaine |
| 6,668,043 | B2 | 12/2003 | Hyziak et al. |
| 6,668,169 | B2 | 12/2003 | Burgan et al. |
| 6,694,007 | B2 | 2/2004 | Lang et al. |
| 6,697,469 | B1 | 2/2004 | Koster |
| 6,697,474 | B1 | 2/2004 | Hanson et al. |
| 6,704,396 | B2 | 3/2004 | Parolkar et al. |
| 6,714,519 | B2 | 3/2004 | Luzzatti et al. |
| 6,714,793 | B1 | 3/2004 | Carey et al. |

(56) References Cited

U.S. PATENT DOCUMENTS

| | | |
|---|---|---|
| 6,721,706 B1 | 4/2004 | Strubbe et al. |
| 6,747,970 B1 | 6/2004 | Lamb et al. |
| 6,751,459 B1 | 6/2004 | Lee et al. |
| 6,757,365 B1 | 6/2004 | Bogard |
| 6,772,188 B1 | 8/2004 | Cloutier |
| 6,775,370 B2 | 8/2004 | Burg |
| 6,788,674 B1 | 9/2004 | Karamchedu et al. |
| 6,788,769 B1 | 9/2004 | Waites |
| 6,801,604 B2 | 10/2004 | Maes et al. |
| 6,807,254 B1 | 10/2004 | Guedalia et al. |
| 6,807,565 B1 | 10/2004 | Dodrill et al. |
| 6,807,574 B1 | 10/2004 | Partovi et al. |
| 6,816,578 B1 | 11/2004 | Kredo et al. |
| 6,823,047 B1 | 11/2004 | Cruickshank |
| 6,865,161 B1 | 3/2005 | Sponaugle et al. |
| 6,865,384 B2 | 3/2005 | Sagi et al. |
| 6,876,728 B2 | 4/2005 | Kredo et al. |
| 6,907,239 B1 | 6/2005 | Sivula |
| 6,907,548 B2 | 6/2005 | Abdo |
| 6,907,571 B2 | 6/2005 | Slotznick |
| 6,938,076 B2 | 8/2005 | Meyer et al. |
| 6,941,345 B1 * | 9/2005 | Kapil et al. .................. 709/206 |
| 6,970,548 B2 | 11/2005 | Pines et al. |
| 6,970,553 B1 | 11/2005 | Gao et al. |
| 6,981,263 B1 | 12/2005 | Zhang et al. |
| 6,987,841 B1 | 1/2006 | Byers et al. |
| 7,039,040 B1 | 5/2006 | Burg |
| 7,043,538 B2 | 5/2006 | Guedalia et al. |
| 7,058,036 B1 * | 6/2006 | Yu et al. ...................... 370/335 |
| 7,062,437 B2 | 6/2006 | Kovales et al. |
| 7,065,185 B1 | 6/2006 | Koch |
| 7,065,186 B1 | 6/2006 | Myers et al. |
| 7,092,696 B1 | 8/2006 | Hosain et al. |
| 7,130,390 B2 | 10/2006 | Abburi |
| 7,133,899 B2 | 11/2006 | Rowe |
| 7,197,120 B2 | 3/2007 | Luehrig et al. |
| 7,203,648 B1 | 4/2007 | Ostermann et al. |
| 7,216,143 B2 | 5/2007 | Creamer et al. |
| 7,269,162 B1 | 9/2007 | Turner |
| 7,287,056 B2 | 10/2007 | Loveland et al. |
| 7,317,908 B1 | 1/2008 | Eason |
| 7,346,658 B2 | 3/2008 | Simpson |
| 7,366,712 B2 | 4/2008 | He et al. |
| 7,415,502 B2 | 8/2008 | Vishik et al. |
| 7,466,657 B1 | 12/2008 | Van Der Wal et al. |
| 7,475,149 B2 | 1/2009 | Jacob et al. |
| 7,917,581 B2 | 3/2011 | Moore et al. |
| 2001/0003202 A1 | 6/2001 | Mache et al. |
| 2001/0033298 A1 | 10/2001 | Slotznick |
| 2001/0034718 A1 | 10/2001 | Shaked et al. |
| 2001/0038624 A1 | 11/2001 | Greenberg et al. |
| 2001/0047333 A1 | 11/2001 | Kim et al. |
| 2001/0048736 A1 | 12/2001 | Walker et al. |
| 2001/0056389 A1 | 12/2001 | Fair et al. |
| 2002/0002470 A1 | 1/2002 | Arai |
| 2002/0007276 A1 | 1/2002 | Rosenblatt |
| 2002/0019846 A1 | 2/2002 | Miloslavsky et al. |
| 2002/0022954 A1 | 2/2002 | Shimohata et al. |
| 2002/0026515 A1 | 2/2002 | Michielsens et al. |
| 2002/0035605 A1 | 3/2002 | McDowell et al. |
| 2002/0037074 A1 | 3/2002 | Dowens et al. |
| 2002/0037735 A1 | 3/2002 | Maggenti et al. |
| 2002/0038212 A1 | 3/2002 | Bernard |
| 2002/0047333 A1 | 4/2002 | You |
| 2002/0057678 A1 * | 5/2002 | Jiang et al. .................... 370/353 |
| 2002/0057765 A1 * | 5/2002 | Hyziak et al. ................. 379/52 |
| 2002/0059138 A1 | 5/2002 | Priest et al. |
| 2002/0059148 A1 | 5/2002 | Rosenhaft et al. |
| 2002/0059425 A1 * | 5/2002 | Belfiore et al. .............. 709/226 |
| 2002/0067714 A1 | 6/2002 | Crain et al. |
| 2002/0071539 A1 | 6/2002 | Diament et al. |
| 2002/0073207 A1 | 6/2002 | Widger |
| 2002/0078150 A1 | 6/2002 | Thompson et al. |
| 2002/0082905 A1 | 6/2002 | Matsuda |
| 2002/0083127 A1 | 6/2002 | Agrawal |
| 2002/0087645 A1 * | 7/2002 | Ertugrul et al. ............... 709/206 |
| 2002/0087704 A1 * | 7/2002 | Chesnais et al. ............. 709/228 |
| 2002/0103917 A1 * | 8/2002 | Kay et al. ..................... 709/229 |
| 2002/0111813 A1 | 8/2002 | Capps |
| 2002/0116464 A1 | 8/2002 | Mak |
| 2002/0118808 A1 | 8/2002 | Kelleher et al. |
| 2002/0122391 A1 * | 9/2002 | Shalit ............................ 370/260 |
| 2002/0129139 A1 | 9/2002 | Ramesh |
| 2002/0136390 A1 | 9/2002 | Lang et al. |
| 2002/0143876 A1 | 10/2002 | Boyer et al. |
| 2002/0146005 A1 | 10/2002 | Gallant et al. |
| 2002/0147002 A1 | 10/2002 | Trop et al. |
| 2002/0160757 A1 * | 10/2002 | Shavit et al. ................. 455/414 |
| 2003/0002633 A1 | 1/2003 | Kredo et al. |
| 2003/0005076 A1 | 1/2003 | Koch et al. |
| 2003/0007625 A1 | 1/2003 | Pines et al. |
| 2003/0013483 A1 | 1/2003 | Ausems et al. |
| 2003/0028380 A1 | 2/2003 | Freeland et al. |
| 2003/0035805 A1 | 2/2003 | Michel et al. |
| 2003/0041048 A1 | 2/2003 | Balasuriya |
| 2003/0063590 A1 * | 4/2003 | Mohan et al. ................. 370/338 |
| 2003/0069934 A1 | 4/2003 | Garcia-Martin et al. |
| 2003/0078987 A1 | 4/2003 | Serebrennikov |
| 2003/0097413 A1 | 5/2003 | Vishik et al. |
| 2003/0104827 A1 | 6/2003 | Moran et al. |
| 2003/0110044 A1 | 6/2003 | Nix et al. |
| 2003/0112930 A1 | 6/2003 | Bosik et al. |
| 2003/0112948 A1 | 6/2003 | Brown et al. |
| 2003/0112952 A1 | 6/2003 | Brown et al. |
| 2003/0115203 A1 | 6/2003 | Brown et al. |
| 2003/0125927 A1 | 7/2003 | Seme |
| 2003/0126213 A1 | 7/2003 | Betzler |
| 2003/0135569 A1 | 7/2003 | Khakoo et al. |
| 2003/0152207 A1 | 8/2003 | Ryan |
| 2003/0161451 A1 | 8/2003 | Fitzpatrick et al. |
| 2003/0163310 A1 | 8/2003 | Caldwell et al. |
| 2003/0185359 A1 | 10/2003 | Moore et al. |
| 2003/0187650 A1 | 10/2003 | Moore et al. |
| 2003/0187658 A1 * | 10/2003 | Selin et al. .................. 704/270.1 |
| 2003/0193961 A1 | 10/2003 | Moore et al. |
| 2003/0208543 A1 | 11/2003 | Enete et al. |
| 2004/0003046 A1 | 1/2004 | Grabelsky et al. |
| 2004/0030750 A1 | 2/2004 | Moore et al. |
| 2004/0062365 A1 | 4/2004 | Agraharam et al. |
| 2004/0076272 A1 | 4/2004 | Zafar et al. |
| 2004/0086100 A1 | 5/2004 | Moore et al. |
| 2004/0128139 A1 | 7/2004 | Ilan et al. |
| 2004/0162773 A1 | 8/2004 | Del Rey et al. |
| 2004/0186909 A1 | 9/2004 | Greenwood |
| 2005/0074101 A1 | 4/2005 | Moore et al. |
| 2005/0136899 A1 | 6/2005 | Pines et al. |
| 2006/0206422 A1 | 9/2006 | Mashinsky |
| 2008/0200143 A1 | 8/2008 | Qiu et al. |
| 2008/0304487 A1 | 12/2008 | Kotecha |
| 2009/0003312 A1 | 1/2009 | Velazquez et al. |
| 2010/0177671 A1 | 7/2010 | Qiu et al. |
| 2012/0094632 A1 | 4/2012 | Titus et al. |

FOREIGN PATENT DOCUMENTS

| | | |
|---|---|---|
| EP | 1059798 | 12/2000 |
| EP | 1104964 | 6/2001 |
| EP | 1176838 | 1/2002 |
| EP | 1274222 | 1/2003 |
| WO | 00/16207 | 3/2000 |
| WO | 00/69140 | 11/2000 |
| WO | 01/35615 | 5/2001 |
| WO | 01/56262 | 8/2001 |
| WO | 01/58110 | 8/2001 |
| WO | 01/86970 | 11/2001 |
| WO | 02/093889 | 11/2002 |

OTHER PUBLICATIONS

Rosenberg et al., "SIP: Session Initiation Protocol", Internet Engineering Task Force, Internet Draft, Feb. 27, 2002.

Pan et al., DIAMETER: Policy and Accounting Extension for SIP, Internet Draft, Nov. 15, 1998.

(56) References Cited

OTHER PUBLICATIONS

Rosenberg et al., "An Application Server Component Architecture for SIP", Internet Engineering Task Force, Internet Draft, Mar. 2, 2001.

Colbert et al., "Advanced Services: Changing How We Communicate", Bell Labs Technology, Bell Laboratories, Murrey Hill, NJ, US, vol. 6, No. 1, Jan. 2001, pp. 211-228.

"Instant Messaging—Wikipedia," http://en.wikipedia.org/wiki/Instant_Messaging, pp. 1-7, retrieved from the Internet on Feb. 24, 2008.

Schulzrinne, et al., "A Comprehensive Multimedia Control Architecture for the Internet," XP000770949, Proceedings of the IEEE 7th International Workshop on Network and Operating System Support for Digital Audio and Video, pp. 65-76, May 19-21, 1997.

\* cited by examiner

| Stations Address/ID 164 | Capabilities 166 | CSSN(s)/ IM Services 168 | Status Information 167 |
|---|---|---|---|
| ... | ... | ... | ... |

| Chat Client Address 173 | CCSN 174 | Servicing Agent Gateway 175 | Servicing Station Address 176 | Session ID 177 |
|---|---|---|---|---|
| ... | ... | ... | ... | ... |

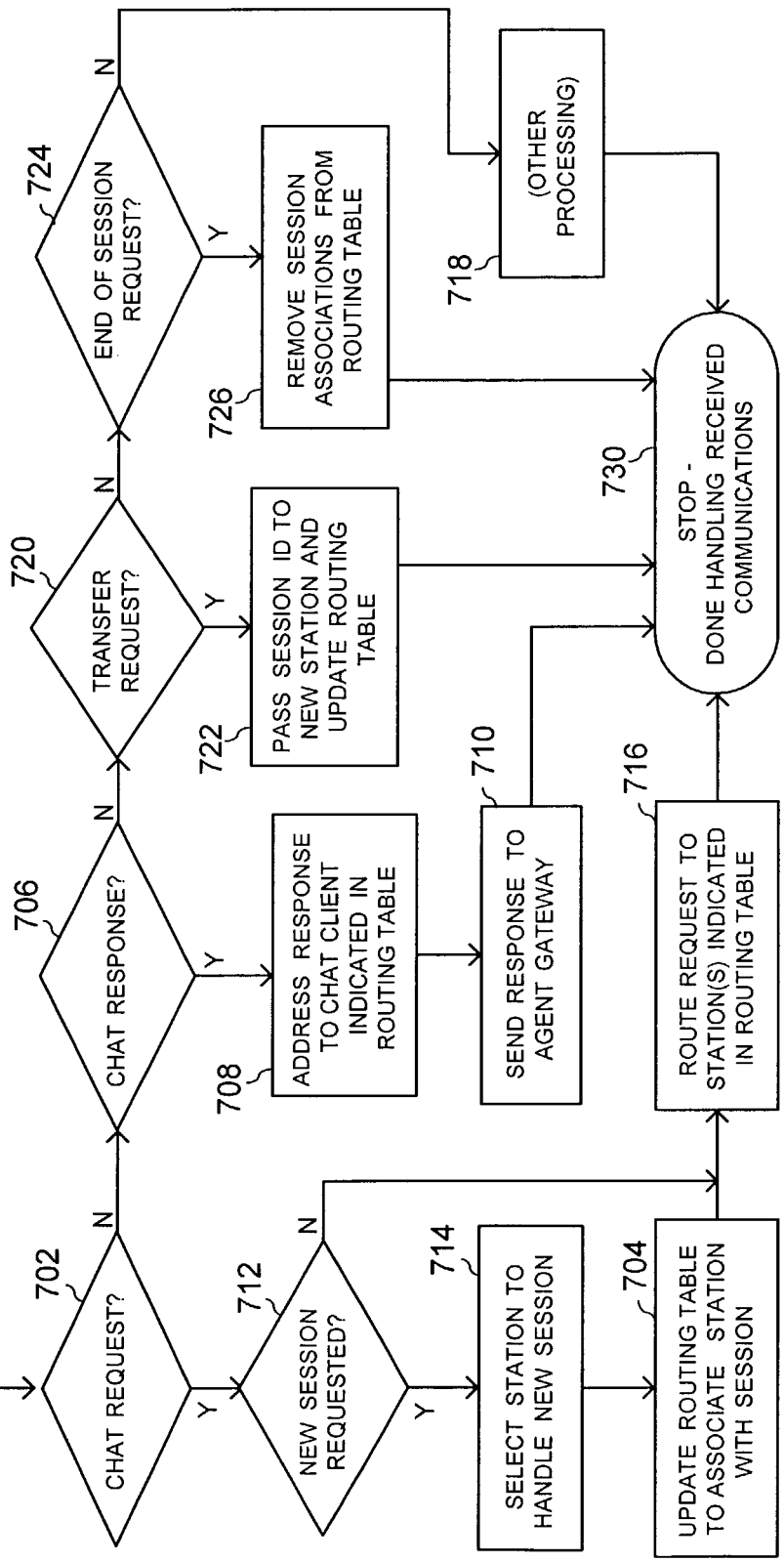

MESSAGING RESPONSE SYSTEM PROVIDING TRANSLATION AND CONVERSION WRITTEN LANGUAGE INTO DIFFERENT SPOKEN LANGUAGE

PRIORITY CLAIM AND CROSS-REFERENCE

The present application claims priority to U.S. Provisional Patent Application Ser. No. 60/369,271, filed Apr. 2, 2002, entitled "Chat-Accessible Services in a Communication System," assigned to the assignee of the present application and incorporated herein by reference its entirety.

The present application is also related to the following co-pending applications, which are assigned to the assignee of the present application and incorporated herein by reference in their entireties:

U.S. patent application Ser. No. 10/404,110, filed concurrently herewith and entitled "Billing System for Services Provided via Instant Communications;"

U.S. patent application Ser. No. 10/404,113, filed concurrently herewith and entitled "Communications Gateway with Messaging Communications Interface;"

U.S. patent application Ser. No. 10/404,093, filed concurrently herewith and entitled "Media Translator;"

U.S. patent application Ser. No. 10/404,104, filed concurrently herewith and entitled "Billing System for Communications involving Telephony and Instant Communications;"

U.S. patent application Ser. No. 10/404,330, filed concurrently herewith and entitled "Call Completion via Instant Communications Client;"

U.S. patent application Ser. No. 10/404,079, filed concurrently herewith and entitled "Enhanced Services Call Completion;"

U.S. patent application Ser. No. 10/404,541, filed concurrently herewith and entitled "Providing of Presence Information to a Telephony Services System;" and U.S. patent application Ser. No. 10/404,094, filed concurrently herewith and entitled "Telephony Services System with Instant Communications Enhancements."

The present application relates to subject matter disclosed in U.S. Pat. No. 6,351,464. The present application also relates to subject matter described in Internet Engineering Task Force document RFC 2778, "*A Model for Presence and Instant Messaging*" by Day, M., Rosenberg, J. and H. Sugano, February 2000.

BACKGROUND

1. Technical Field

The present invention relates in general to data processing and, in particular, to permitting access to services through instant messaging communications.

2. Description of the Related Art

In traditional telephony, a variety of operator services have been available from telephone service providers. In general, operator services entail an agent of the service provider assisting a telephony caller in establishing or conducting communications sessions. In some cases, this agent may be a human operator who converses with a caller to provide assistance. The agent may also be an automated system that responds to a caller's voice or keypad inputs by providing assistance or by otherwise acting upon the caller's inputs.

One well-known example of an operator service is "directory assistance" by which a caller may request and receive the telephone number of another party from a service provider agent. Operator services may additionally be utilized to, on behalf of a caller, perform acts such as call completion, establish multi-party conference calls, provide access to telephony services by callers employing calling cards or alternate billing arrangements (e.g., calling collect), provide relay or other services to special needs callers, etc.

In the case of directory assistance services, the caller desires to initiate a telephone call to another party, but does not know the correct telephone number to dial to reach the party. In a conventional directory assistance scenario, the caller first dials an operator ("0") or a directory assistance number ("411" or Area Code+"555-1212"), and the caller is connected to an agent. The caller then indicates to the agent which party they desire to reach. The agent consults a list or database to locate a telephone number or other information relating to the identified party and provides the information to the caller verbally or by computer-synthesized speech. The caller may simply record the information for future reference or may immediately seek to contact the party by dialing the provided telephone number.

In many implementations, the agent may also offer the caller the option to automatically complete the call to the other party as an extension of the directory assistance call, thus saving the caller from having to record the telephone number provided by directory assistance and then immediately re-enter the telephone number in a subsequent call attempt. Such directory assistance and call completion services are often provided at a fee which the service provider may bill to the caller or seek to have paid immediately, such as through a pay telephone.

More recently, sources of directory information and the like have become available on the Internet. A person needing contact information for another party may access a website via the Internet using a browser application and enter identifying information about a party. In order to facilitate entry of the identifying information, a form is typically presented comprising entry fields for name (of a person or business), address, city, state, etc. so that the user initiating the inquiry can specify whatever information is known about the party for which contact information is sought. The greater the specificity provided by the requester, the fewer candidate records will be returned by the website's search engine.

Although many directory information services available on the Internet are provided free of charge, the information provided is often incomplete or outdated. Many of the databases underlying such websites are not derived in a direct and timely manner from current information used by the communications service providers in routing calls, but are instead compiled indirectly from other sources. In the case where a directory look-up website cannot resolve a given request or cannot find any records, it is ambiguous whether the request is inherently unserviceable or whether the website merely lacks the necessary data. Many such websites simply provide links to other similar sites that the user may try.

Quite frequently, a person is using a computer to perform various tasks when the need arises to obtain contact information for a given party. This contact information might be needed for immediately establishing communications with the party, such as through a telephone call. Alternatively, this contact information may be needed as part of a task on the computer, such as preparing an outgoing letter or a report that is to include the contact information. Naturally, the person engaged in such a task will want to use the computer to obtain the contact information, particularly if the computer is coupled to the Internet and may access directory look-up websites as described above.

One advantage of employing this approach, rather than making a telephone call to a directory assistance agent, is that the desired information is returned to the computer system in a textual format which may be readily copied and "pasted" into a word processing document, database or other application running on the computer system. By receiving and entering the information in entirely electronic form, the user is saved considerable time and effort as compared to obtaining the desired information from a directory assistance agent in audio format and then manually entering the information into the computer system. The reduction in time and effort is particularly significant when the information comprises lengthy data, such as a complete mailing address and/or secondary contact information (e.g., mobile telephone number, fax number, e-mail address, website URL).

Another significant factor which motivates directory lookup online is the prevalence of "dial-up" modem connections to the Internet. If a user has access to only a single telephone line and the user is already utilizing the telephone line to connect to the Internet, it is burdensome for the user to "drop" the modem connection to the Internet and place a conventional telephone call to obtain directory assistance services. Furthermore, online directory information may be free of charge or less costly than calling a directory assistance operator.

SUMMARY

In recognition of the foregoing, the present invention provides methods, systems and program products that provide access to services, such as directory assistance, through a textual instant communications, such as an instant messaging or so-called "chat" session. An entity such as a commercial service provider may provide information or may otherwise be able to provide services through an instant messaging or short messaging interaction. Using a chat client application of some type parties needing such services or information establish instant communications with the service providing entity. The service providing entity is preferably identified to such parties using a particular "screen name" identifier. A "screen name" is one term applied to an identifier by which a party is known in the context of a particular messaging service or messaging system. The service providing entity may provide one or more respondents or "chat agents" to handle and respond to requests from parties accessing the service.

In accordance with the present invention, access to services over a network is provided via a chat session. An entity, such as a commercial service provider having access to information, provides a message response system comprising one or more chat agents capable of responding to requests from chat clients. A chat agent may be a human-operated messaging station or an automated respondent acting through a messaging station or messaging client interface.

In accordance with a preferred embodiment, the service provider may simultaneously communicate with, and fulfill requests for, many different parties even though the same screen name for the service provider may be known to and used by many parties substantially simultaneously. In accordance with a novel aspect of some embodiments of the present invention, volumes of incoming requests may be distributed among a plurality of chat respondents representing the service provider and may be properly dealt with on an individual basis, even though all inbound requests may be addressed to the same screen name. This behavior is achieved by a new and useful approach to routing messaging communications, such as to a respondent messaging station, based on the originator's identity or screen name rather than based upon the recipient address specified in the messaging communications.

According to a method described herein, a chat agent gateway indicates its presence to an instant messaging presence service to inform chat clients of its availability to receive requests for service. In response to the agent gateway receiving a request by a chat client for services via a chat session, the chat agent gateway forwards the request to a station within a chat-based services system. The station then provides the requested services, and the chat agent gateway communicates information regarding the requested services to the chat client in the chat session.

In accordance with some embodiments of the present invention, a chat-accessible service system offers the ability for a requestor using a chat client to have a call to another party completed upon demand via the service system.

In accordance with some embodiments of the present invention, a chat accessible service system may establish communications between a chat client and another party through a computer telephony connection, a voice-enabled chat connection or a translated text-chat-to-telephone-voice connection.

An exemplary embodiment of the present invention discloses, in a communications system, a method for managing messaging communications among a plurality of parties and a messaging response system comprising a plurality of messaging stations. The method comprising the steps of receiving first messaging communications at the messaging response system, identifying a first party as having originated first messaging communications, and selectively routing the first messaging communications to a particular first messaging station based upon an identity of the first party.

An exemplary embodiment of the present invention discloses a session router for routing messaging communications among a plurality of parties and a messaging response system comprising a plurality of messaging stations. The session router comprising a messaging service interface for communicating messaging communications among a first party and the messaging response system, a routing associating means for providing a first routing association between messaging communications associated with the first party and a first messaging station, and a session routing process for causing messaging communications from the first party to be selectively communicated to the first messaging station responsive to the routing association represented by the routing associating means.

An exemplary embodiment of the present invention discloses a session router for managing instant messaging communications to a plurality of instant messaging stations. The session router comprising means for receiving an instant messaging communication from a first messaging party, and means for associating a first instant messaging station with a first instant messaging party wherein instant messaging communications received from the first instant messaging party are directed to the instant messaging station.

An exemplary embodiment of the present invention discloses a service providing system for providing service to a first party via messaging communications with the first party, the first party being coupled to a messaging system. The service providing system comprising a messaging system interface means for communicating with the messaging system, wherein first messaging communications from the first party are received by the service providing system a first messaging station for performing a service responsive to messaging communications received from the first party, and a session router means for selectively directing the first messaging communications from the first party to the first messaging station.

An exemplary embodiment of the present invention discloses a method for providing a service to a party via instant communications. The method comprising establishing first communications with an instant communications client associated with the first party, and responsive at least to the first communications, causing second communications to be established via a communications network.

An exemplary embodiment of the present invention discloses a service providing system for providing service to a first party via messaging communications with the first party, the first party being coupled to a messaging system. The service providing system comprising a messaging system interface means for communicating with the messaging system, wherein first messaging communications from the first party are received by the service providing system, a first messaging station for performing an action responsive to messaging communications received from the first party, and a communications network control interface means for coupling the service providing system to a communications network wherein the service providing system causes the communications network to establish communications.

An exemplary embodiment of the present invention discloses a computer-readable medium comprising instructions which, when executed by a processor, cause a communication system to perform a method for managing messaging communications among a plurality of parties and a messaging response system, the message response system comprising a plurality of messaging stations. The method comprising receiving first messaging communications at the messaging response system, identifying a first party as having originated first messaging communications, and selectively routing the first messaging communications to a particular first messaging station based upon the identity of the first party.

An exemplary embodiment of the present invention discloses a computer-readable medium comprising instructions which, when executed by a processor, cause a service providing system to perform a method for providing service to a party via messaging communications, the first party using an instant communications client. The method comprising the steps of establishing first communications with an instant communications client associated with the first party and responsive at least to the first communications, causing second communications to be established via a communications network.

An exemplary embodiment of the present invention discloses a system for providing a service to a party via instant communications. The system comprising means for establishing first communications with an instant communications client associated with the first party, and means for causing, responsive at least to the first communications, second communications to be established via a communications network.

An exemplary embodiment of the present invention discloses, in a service providing system, a method of providing service to a first party via messaging communications. The method comprising the steps of, at the service providing platform, receiving a first messaging communication from the first party, wherein the first messaging communication is addressed to an instant communications screen name associated with the service providing system, and responsive at least to the receiving the first messaging communication from the first party, establishing a communications session wherein at least one participant communicates without having to compose discrete messages.

Another exemplary embodiment of the present invention discloses, in a service providing system, a method of providing service to a first party via messaging communications comprising the steps of, at the service providing platform, receiving a first messaging communication from the first party, wherein the first messaging communication is addressed to an instant communications screen name associated with the service providing system, and responsive at least to the receiving the first messaging communication from the first party, establishing a communications session wherein at least one participant communicates without having to compose discrete messages.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5A illustrates an exemplary embodiment of a registration table utilized by the session routing process depicted in FIG. 4 to track human-assisted and automated stations registered with the session routing process and their respective capabilities;

FIG. 5B illustrates an exemplary embodiment of a routing table utilized by the session routing process depicted in FIG. 4 to route requests for services and responses to such requests between the agent gateways and the human-assisted and automated stations;

FIG. 7 is a high level logical flowchart of an exemplary method by which the session routing process illustrated in FIG. 6 routes communication between stations within the chat-based service system and agent gateways in accordance with the present invention;

In the figures, like reference numbers generally indicate identical, functionally similar and/or structurally similar elements.

DETAILED DESCRIPTION

Figure 1:
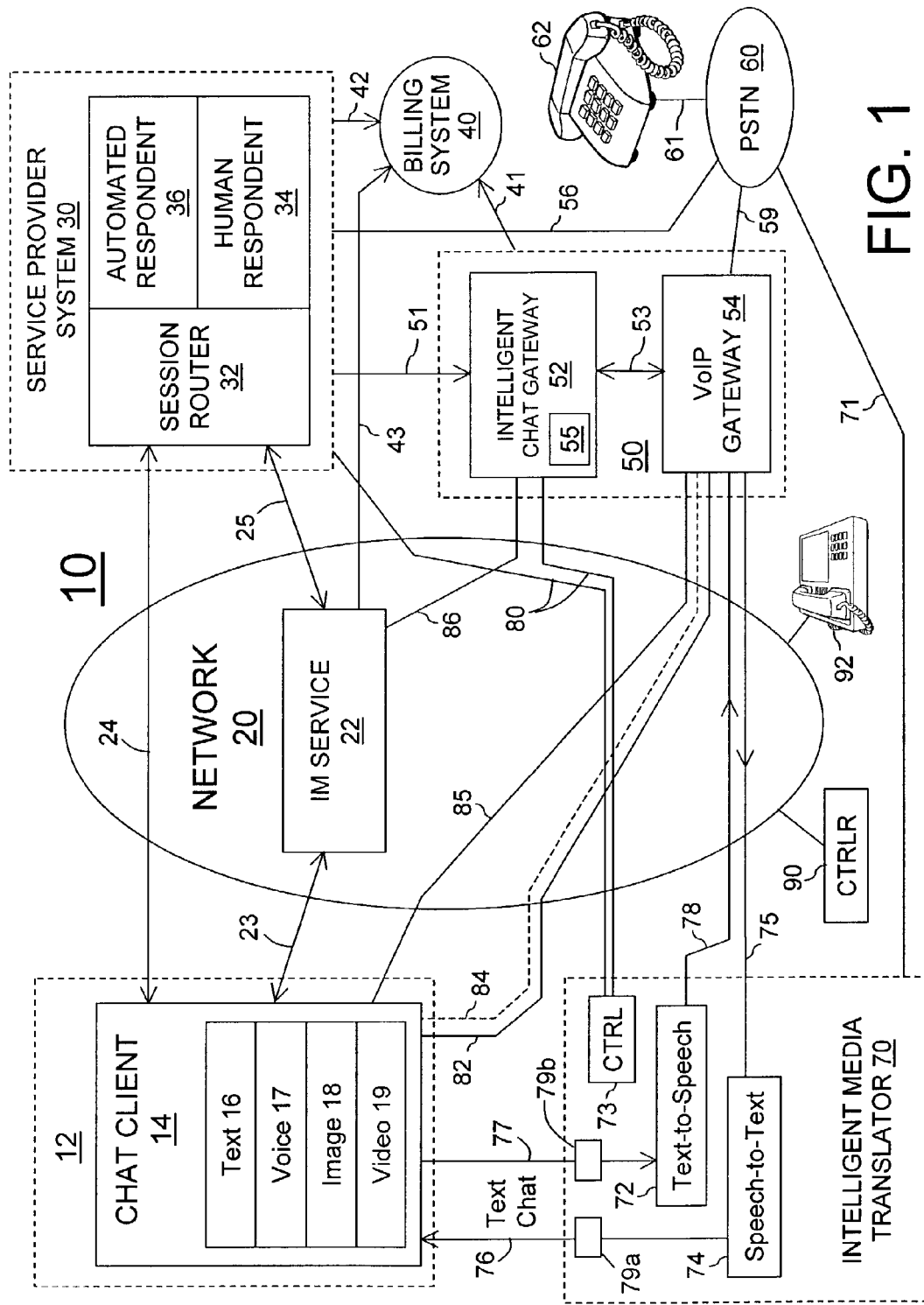
FIG. 1 illustrates a high level block diagram of an embodiment of a communication system that supports chat-based access to services in accordance with the present invention.

Systems, methods and computer-implemented processes for call processing are described. In the following description, for the purposes of explanation, numerous specific details are set forth in order to provide a thorough understanding of the present invention. However, it will be apparent to one skilled in the art that the present invention may be practiced without these specific details or with an alternative equivalent arrangement. In other instances, well-known structures and devices are shown in block diagram form in order to avoid unnecessarily obscuring the present invention.

The present invention achieves advantages in that parties are able to access services via instant communications, such as by instant messaging. In accordance with a preferred embodiment, the present invention further provides that one type of service accessible via instant communications involves parties being able to initiate other communications sessions, even those involving telephone networks. In one example application of this capability, a first party using an instant messaging client may establish communications with a second party who is accessible by telephone.

One form of communications popularized in recent years is electronic messaging communications. Messaging communications are generally characterized by a communicating party determining a finite amount of information to be sent as a message. Messaging communications typically involve one or more discrete messages sent by a party to one or more other parties. A message may comprise text, data or digitized audio or video information, for example, or even combinations of these. Electronic mail (e-mail) and text paging are forms of electronic messaging communications.

In contrast to messaging, other forms of communications, such as telephony, enable a period of essentially continuous (and usually full duplex) two-way conversation between parties in the context of a single session or connection. As in the example of telephony, the parties generally only determine the time duration of the overall session and are not engaged in composing and sending messages of a specific size.

'Instant messaging' refers to messaging communications wherein the delays in readying the message for delivery (such as addressing to a recipient), transporting the message, and bringing the message to the attention of the recipient are sufficiently short or imperceptible that parties may communicate in a nearly conversational manner. In the case of a form of instant communications known as 'text chat' sessions, the conversational pace is often limited mainly by the time it takes for chat participants to compose and finalize messages to be transmitted. The acceptable margin of delay in message transmission may be on a different scale than for the end-to-end delay margins in telephone communications, but the objectionable impact of excess delay on perceived fluency of communications is a common detriment to both modes of communication.

Instant messaging may be considered a type of instant communications. Some popular applications that are commonly used for instant messaging include, for example, America Online (AOL) Instant Messenger™ (hereinafter AIM), Yahoo!® Messenger and MSN® Messenger. The present invention is not limited to embodiments using these specific applications, technologies or services.

In one sense, 'instant communications' may refer to a style of communicating wherein the communicating parties experience substantially immediate establishment of communications on a per-message basis. In the context of instant messaging, a selection made be initially made by a first party to open a dialog with a specific second party. Thereafter, the parties may spontaneously generate and send messages without having to address each message or perform other steps preparatory to the sending of each message.

Furthermore, the term "instant communications" may be applicable in the sense of there being no user-perceivable session establishment as each message is sent, even though each message is in fact sent as a brief burst of information transmission activity through the network. At some level, each transmission burst may be handled as a separate communications session.

The user does not have to engage in per-message establishment of a session, if applicable, nor is any significant delay perceived by the user arising from automatic session initiation that might be briefly performed at some level through, for example, a TCP/IP connection. In one regard, then, the instancy of instant communications may be viewed as relating to the performance of session initiation and addressing without burdening the user and with sufficiently little delay as to be minimally perceptible or inconsequential to the user.

Instant communications may also be 'instant' in the sense that, when a message is composed and sent, it is fairly immediately routed to a destination, such as an instant messaging client. As a message is composed and sent, the sending party may be provided with some indication that the destination is ready to receive messages or at least has recently claimed to be open to receiving messages. This forehand knowledge may be provided by presence technology described below. Except for very brief queueing in data buffers in routers and transmission equipment in the course of transmission, the message is not substantially stored anywhere in the network for the purpose of being delivered to the recipient at a later time or at a time determined by the recipient.

This instantaneous handling of messages may be contrasted to a typical e-mail system, wherein a message is often stored in a repository for a significant time period waiting for the recipient mail client application to poll for new mail items to download from the mail server. An electronic mail message may be stored on an e-mail server for a time duration of less than a minute, for several hours, for several days or even indefinitely.

After polling a mail server and downloading any new messages, an e-mail client typically terminates communication with the mail server until a future time when the mail client again polls the server. The polling may be triggered by a time interval setting or by manual request from a user. Between such polling times, the mail server or service merely stores messages.

Another characteristic typical of instant communications is immediate presentation of the message content to the receiving party upon arrival of the message. A message received by an instant messaging client is immediately presented, such as in a window in a graphical user interface on a display device, or otherwise made known to the receiving party. The user is not required to take any action to receive or initiate delivery of each message that arrives. Message reception and presentation is usually automatic and immediate.

In contrast to electronic mail clients, it is generally unnecessary in instant communications for the user to poll a server either manually or automatically at certain time intervals, nor is the user require to take additional action, as there is with "opening" an e-mail, to have the content displayed. Furthermore, unlike an e-mail 'inbox' stored as a file in a non-volatile storage device, there is typically no systematic storing of the received message at the receiving end for the purpose of presenting the message to the recipient for the first time at a time substantially later than it was received.

Instant communications may refer to any communications involving an instant communications client, such as an instant messaging client application running on a computer. An instant communications client may be an imbedded application as embodied in a personal digital assistant (PDA), mobile phone or other portable device. An instant communications client may support instant messaging, such as text-based chat. An instant communications client may also support audio communications having little enough delay to enable interaction among communicating parties in a nearly conversational style. As a mode of communication, instant communications may be contrasted to toll-quality telephony, which provides full-duplex communications, with any transmission delay being mostly attributable to propagation (at electronic speeds) and to vocoder signal processing delays. Users of text messaging and voice-enabled instant communications clients in conjunction with data transport networks may experience greater delays or less reliable transport than by a telephony mode of communication. Nevertheless, many users find instant communications to be adequate, more cost effective, and even preferable to more traditional telephony in some circumstances. The 'instant' quality of such communications achieves much more of a real-time interactive nature than paging or e-mail modes of communication.

In many implementations, instant communications are complemented by "presence" technology—a mechanism through which parties receive timely information about the availability of others to communicate. A presence service acts as an intermediary through which a party may express availability to communicate and may be informed about the availability of other parties. A description of presence technology may be found in document RFC 2778 of the Internet Engineering Task Force (IETF).

Presence technology facilitates instant messaging and supports the perceived instantaneous nature thereof. Indeed, one of the key motivations for applying presence techniques in the context of instant messaging is that, as described above, there is typically very little storage of messages for later delivery to a recipient. Consequently, it is often useful for a sending party to know, before assembling and sending messages, whether the messages are likely to be received or presented to the recipient in a timely manner. In the experience of the sending party, presence technology can be a factor affecting one's expectation or perception of instancy. To party intending to send a message, presence technology attempts to provide awareness of the availability status of the intended recipient (or at least the readiness state of the recipient's instant communications client) before communications are sent to the recipient. When a sending party does observe that a recipient is present via presence technology, the party may then confidently send communications and reasonably expect that the transmitting and presenting the message to the recipient will be immediate or nearly instantaneous. Presence differs from, for example, the placing of a collect call in that presence information for a party is often maintained before the time it is actually needed in the context of someone communicating with party.

In general, presence technology is intended to provide an up-to-date indication of the presence of other parties. Of course, availability information for a party may be subject to change and to the party's desire to accept communications. The timeliness of availability information may also vary depending on implementation. A prospective sender of communications usually does not need not perform additional actions to ascertain presence of other parties at any point in time, such as immediately before sending a message. Instead, as in many instant messaging client applications, presence state of a group of addressees is constantly updated and indicated on a user interface. This self-updating aspect of some presence implementations further lends to the instancy and spontaneity with which users may initiate and carry on instant communications.

A communicating party may engage in instant communications using an instant communications client, such as an instant messaging client application running on a computer. An instant communications client may be an imbedded application as embodied in a personal digital assistant (PDA), mobile phone or other portable device. An instant communications client may support instant messaging, such as text-based chat. An instant communications client may also support audio communications having little enough delay to enable interaction among communicating parties in a nearly conversational style. As a mode of communication, instant communications may be contrasted to toll-quality telephony, which provides full-duplex communications with any transmission delay being mostly attributable to propagation (at electronic speeds) and to vocoder signal processing delays. Users of text messaging and voice-enabled instant communications clients in conjunction with data transport networks may experience greater delays or less reliable transport than by a telephony mode of communication. Nevertheless, many users find instant communications to be adequate, more cost effective, and even preferable to more traditional telephony in some circumstances. The 'instant' quality of such communications achieves much more of a real-time interactive nature than paging or e-mail modes of communication.

In various embodiments, the present invention advantageously employs instant communications and presence technology, as described above, to provide services to parties who are using instant communications clients as will now be described in conjunction with FIG. 1.

With reference now to the figures, and in particular with reference to FIG. 1, there is illustrated a high level block diagram of an embodiment of a communication system that provides chat-based services in accordance with the present invention. As illustrated, communication system 10 includes a data processing system 12 coupled by a communications network, network 20, to a service provider system 30 that provides chat-based services. Data processing system 12 may comprise any of a desktop personal computer system, laptop or handheld computer system, personal digital assistant (PDA), mobile telephone, television set-top box, or other existing or later known or developed electronic device that supports communication with network 20. As is well understood to those of ordinary skill in computing, in addition to operating system software (not explicitly shown), data processing system 12 may execute chat client 14 as an application. Chat client 14 is a form of instant communications client that supports real-time or substantially real-time instant messaging communication by a principal (i.e., human user, software program or combination of human user and software program) associated with data processing system 12.

Using chat client 14, the principal may communicate with one or more other principals accessible through network 20. (Note that the principals who may use chat client 14, IP telephone 92 or conventional telephone 62 as communication appliances are not separately depicted in FIG. 1.) Chat client 14 may be implemented by or based upon well known instant messaging and/or chat client programs, such known America Online (AOL) Instant Messenger™ (hereinafter AIM), Yahoo!® Messenger, or MSN® Messenger. Alternatively, chat client 14 and instant messaging server 22 may represent proprietary, private or semi-private messaging systems which, for example, are operated within a business enterprise or organization. Chat client 14 is shown to include a number of modules 16, 17, 18 and 19 that enable communication via a variety of media including text, voice, images and video, respectively. Each module may support, for example, composition, transmission, encryption, encoding, and compression of outbound communications and reception, decompression, decoding, decryption and presentation of inbound communications for a given type of media.

There are several techniques for operating an instant messaging system. In accordance with one technique, a intermediary server, such as a presence server, commonly accessible to a population of users helps parties become aware of each other and establish communications. Once a set of parties have become aware of each others' network addresses, then the subsequent message traffic between the parties bypasses the common server and passes directly between the chat clients in a peer-to-peer fashion. In accordance with another technique, chat clients establish contact with one another and carry on communications without requiring an intermediary server at all. In accordance with yet another technique, a commonly accessible server not only helps establish contact among parties but also is involved in all subsequent communications. In this case, the communicating parties need not be aware of each others network addresses, but rather only the "screen names" or handles by which they are each uniquely identified in the server.

These alternatives are represented in FIG. 1 by three connections. Connections may be logical or physical in practice and achieve an coupling or communicative interface between elements. Connections may be implemented as interprocess communications among software processes. Connections may also refer to, or be implemented as, communications between points served by a data transport network, even if the data transport network employs a so-called 'connectionless' technique of routing information within. Connection 23 between chat client 14 and instant messaging (IM) service 22 is the means by which chat client 14 may report its availability to communicate and to be informed of the availability of other parties to communicate. Connection 25 performs a similar purpose between service provider system 30 and IM service 22. In addition to carrying presence information, connections 23 and 25 may also carry chat communications between chat client 14 and service provider system 30, using IM service 22 as an intermediary in the chat messages.

Alternatively, connections 23 and 25 may be used solely for presence indication and another connection 24 may be formed through network 20 for carrying communications directly between chat client 14 and service provider system 30 without involving IM service 22.

Figure 2:
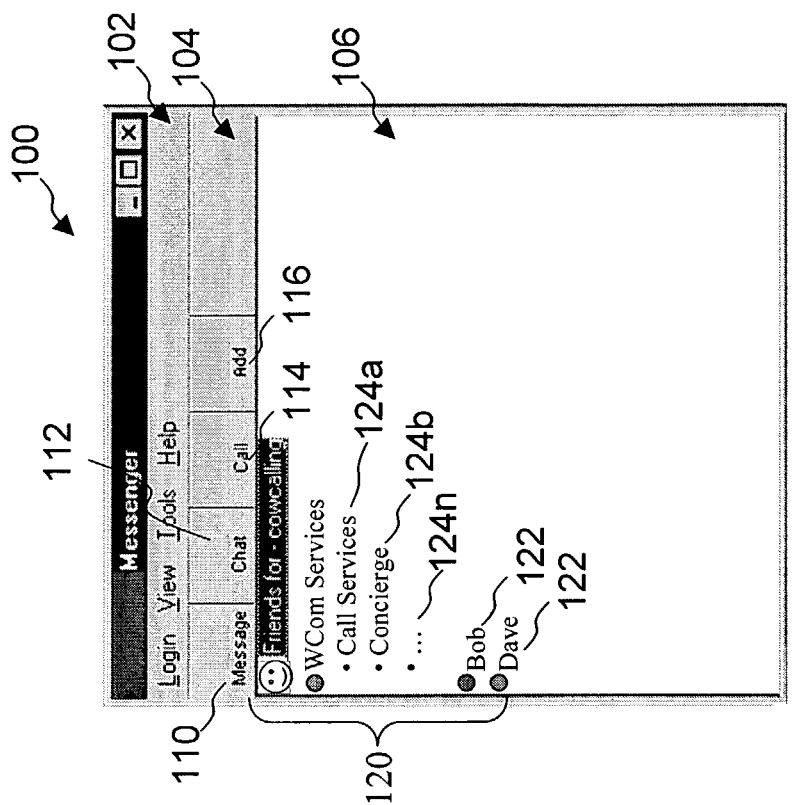
FIG. 2 depicts an exemplary graphical user interface of a chat client in accordance with one embodiment of the present invention.

Chat client 14 of FIG. 1 may present a user interface similar to what is depicted in FIG. 2. Referring briefly to FIG. 2 before continuing the discussion of FIG. 1, there is illustrated an exemplary graphical user interface that may be presented by chat client 14 within a display device of data processing system 12 in accordance with one embodiment of the present invention. As shown, the graphical user interface of chat client 14 includes a messenger window 100 having a menu bar 102, a toolbar 104 and a display frame 106.

Within display frame 106, a friends list 120 is displayed that contains identifiers of parties that may be contacted by chat client 14 via instant messaging. Friends list 120 (also known as a buddy list or contact list) may include both default identifiers automatically placed within friends list 120 by chat client 14 and user-supplied identifiers added to friends list 120 by a user of chat client 14 through a utility invoked by selection of add button 116 within toolbar 104. At any given moment, the listing or visual appearance of each contact in friends list 120 may be affected by presence information received from a presence server. In this manner, a principal using chat client 14 may readily determine which of the contacts is available for communicating.

In the exemplary scenario, friends list 120 is organized in a tree structure containing both individual identifiers 122 identifying individual parties (e.g., "Dave") and grouped identifiers 124a-124n, which are all related to a particular party (i.e., "WCom Services"). In this example, grouped identifiers 124 each represent a different chat-accessible service offering (e.g., call-related services and concierge service) of service provider system 30, as detailed below. One type of identifier that may be presented in friends list 120 or made accessible via other user interface elements may relate to a personalized service. By selecting this identifier in the user interface, a principal using chat client 14 may establish readily communications with a service providing entity that provides personalized services. For example, the service provider may have a specific respondent or agent principal assigned to provide services to the particular principal and to be familiar with how to provide services. When the principal selects the identifier corresponding to the personalized service, the principal is connected to the respondent assigned to serving them. This activity may also be personalized in the sense that information pertaining to the principal, such as preferences or knowledge from previous sessions, may be maintained by the service provider and applied to serving the principal.

To communicate instant messages with one of the individual parties in friends list 120 or one of the chat-accessible services, the user typically selects one of the identifiers 122, 124a-n within friends list 120 and then selects message button 110. As described further below, chat client 14 may then present an instant messaging window through which text instant messages can be exchanged in real time with one or more other parties. Of course, for other types of communication, such as audio or video communications, chat client 14 may provide other relevant user interface elements or controls.

Alternatively, if the user of chat client 14 desires to establish or join a chat room (i.e., typically a loosely topical forum in which a large number of users may participate), the user selects chat button 112 on toolbar 104 to invoke display by chat client 14 of a chat window through which the user can select a chat room and send and receive text messages. If the user wants to initiate a telephony call, the user can select call button 114 to invoke display of a telephony interface through which a voice-over-Internet Protocol (VoIP) call may be established. Any of the additional interfaces displayed by chat client 14 (e.g., in response to selection of buttons 110-114) may also include controls that permit a user to request specific chat-accessible services.

Such controls may be added optionally by the user or may be included as part of the messenger window 100 application. It is also contemplated, as will be readily understood by those of ordinary skill, that a convenient means for establishing communications to chat-accessible services may be implemented as an activatable control that may be added to other applications such as e-mail clients or word processing applications or may appear as an icon on a workstation's "desktop" screen. Activating such a control may cause a chat client window to appear and automatically begin a session with a specific screen name corresponding to a particular chat-accessible service. For example, a button may be added to the toolbar of an e-mail application which, when activated, instantly puts the user in contact with a service, such as a directory information service, through a chat session.

Referring now back to FIG. 1 and resuming the discussion thereof, network 20 may comprise one or more local area networks (LANs) or wide area networks (WANs), for example, the Internet, linked by conventional bridges, routers or the like. Alternatively or in addition, network 20 may include wireless networks, switched networks, and other forms of common carrier transmission lines and equipment that can link remote data processing systems, such as the data processing system 12 to service provider system 30.

Service provider system 30 is coupled to network 20 to provide services to principals communicating with service provider system 30 over network 20 using chat communications. Service provider system 30 may or may not be affiliated with the same network service provider or Internet Service Provider (ISP), if applicable, through which data processing system 12 accesses network 20. Service provider system 30 can be implemented, for example, by one or more computer systems running one or more software modules or processes. Service provider system 30 is receptive to communications, such as requests, from parties who access the system via instant communications. In a sense, service provider system 30 may be referred to as a 'service'. Users may be said to contact the service and service providers may be said to operate the service, referring in both cases to the availability of service provider system 30 in a useful capacity.

As described further below, the services provided to principals by service provider system 30 may include, without limitation, directory assistance, call completion, conference call establishment, customer support, concierge services, and other services traditionally provided by telephony operator service providers. The services may also include services not traditionally offered by telephony operator service providers, including, without limitation, video conference establishment, chat or email address assistance, or any other services presently known or contemplated or developed in the future. Because such services provide significant value, service provider 30 may be further coupled to a billing system 40 that determines charges associated with the use of the services (e.g., to a principal associated with data processing system 12, a third party, a prepaid calling card, etc.).

It is noteworthy that aspects of the present invention provide for a party requesting services to author such requests in a "free-form" manner, that is, using human-readable text in a natural style akin to conversational language. The requestor may not be required to compose textual requests obeying a certain syntax. Access to services afforded in accordance with embodiments of the present invention may provide a natural language interface to many services that have heretofore never provided natural language interfaces nor perhaps human-readable interfaces of any type. In accordance with exemplary embodiments presently described, a natural language dialog carried out through a messaging communications session may be employed to invoke a separate second communications session that may be telephonic or non-messaging in nature. In a novel fashion, a textual chat session may be employed to establish another communications session wherein at least one party is able to communicate without discretely composing messages.

As will be further described later in conjunction with FIG. 3, service provider system 30 may support the provision of both human-assisted (or "operator") chat messaging stations 142 making up human-assisted chat services system 34 and automated chat messaging stations 140 making up automated chat services system 36. Either or both of automated chat services system 36 and human-assisted chat services system 34 may be included in a chat-based services system 35. Thus, chat-based services system 35 comprises a platform of messaging respondents and may support the capability of handling each session with a client data processing system 12 through automated or human interaction or a combination thereof.

It will be appreciated by those of ordinary skill in the relevant art that any of the chat services systems 34, 35 and 36 may also be referred to as corresponding functions, services or processes and may be implemented in a variety of ways involving, for example, workstation hardware, network connections and software-implemented processes.

Furthermore, as will be described further below in conjunction with FIG. 3, service provider system 30 preferably includes a session router 32 that directs chat sessions requesting services to respondent stations comprising either or both of human-assisted messaging stations 142 and automated messaging stations 140, as is required or advantageous to provide the requested service.

Still referring to FIG. 1, communication system 10 may further include a gateway system 50 coupled to network 20 or service provider system 30 to support the completion of calls between data processing system 12 and stations (e.g., telephone 62) within wireless or wired telephony networks, such as the Public Switched Telephone Network (PSTN) 60. PSTN 60 may comprise telephony switching equipment and may actually represent any form of telephone network, such as a private branch exchange (PBX), a virtual private network (VPN) or other type of network as will be appreciated by those of ordinary skill in the art.

As shown, gateway system 50 logically may include two elements: an intelligent chat gateway 52 that serves as an interface to service provider system 30 and a voice-over-Internet Protocol (VoIP) gateway 54 that serves as a telephony network interface. In general, VoIP gateway 54 is a form of packet telephony gateway similar to those well known in the art and typified by a model AS5300 gateway manufactured by Cisco Systems, Inc. However, in accordance with a novel aspect of a preferred embodiment of the present invention, such gateway function is empowered to originate communications in disparate networks rather than merely pass along signaling and bearer communications between networks. VoIP gateway 54 represents a broader class of packet telephony or voice-over-packet(VoP) gateways, meaning that it is possible to employ packet data transport networks whether or not the particular Internet Protocol is used. Via connection 59 VoIP gateway 54 interfaces to a telephone network, such as PSTN 60. Along connections 75, 78, 82, 84 and 85, VoIP gateway 54 may present much the same type of packet telephony interface as is commonly employed in communicating with IP telephones, such as IP telephone 92.

Service provider system 30 may communicate along connection 51 to intelligent chat gateway 52 to cause gateway 50 to make connections with either or both of network 20 and PSTN 60. Communication along connection 51 may comprise contact information pertaining to a messaging client that is used by the gateway to establish communications with the messaging client. In response to requests from service provider system 30, intelligent chat gateway may also communicate with other elements, such as intelligent media translator (IMT) 70 to coordinate desired connections among parties.

Intelligent chat gateway 52 may issue instructions or send information along connection 53 to VoIP gateway 54 to cause, or to facilitate the formation of, communication pathways through the latter. In practice, connections 51 and 53 may each be a data path through network 20, perhaps secured by encryption, firewalling, IPsec practices, or other measures. With respect to service provider system 30, connection 51 represents a network control interface by which one or more communications networks may be controlled, such as through gateway 50.

Intelligent chat gateway 52, in conjunction with other elements such as service provider system 30, may implement a method for managing messaging communications through a gateway, the method involving receiving indication that communications are to be established through the gateway and then causing the gateway to engage, for example, in communications involving a chat client or involving instant messaging communications. Various elements in FIG. 1 may also cooperate to implement a method whereby gateway 50, in effect via messaging interface function 55, participates in instant messaging communications or communications with instant messaging clients or servers and then some aspect of the communications through the gateway, such as formation of connections from PSTN 60 to network 20, are affected by the instant messaging activity. Such methods may be implemented as computer program products for execution by computer processing devices and may be conveyed via computer-readable medium or by transmission of executable instructions. Thus, in some implementations, messaging interface function 55 may endow intelligent chat gateway 52, or gateway 50 in general, with the ability to interact with instant communications systems, such as IM service 22, in establishing instant communications sessions involving gateway 50 or IMT 70.

The integration of intelligent chat gateway 52 into gateway 50 as shown in FIG. 1 is but one contemplated embodiment. In various embodiments, intelligent chat gateway 52 may be implemented in hardware and/or software in combination with either or both of service provider system 30 and VoIP gateway 54 or as a standalone system. For example, intelligent chat gateway 52 may be implemented as a software program executing on one or more computer systems forming a portion of service provider system 30; alternatively, intelligent chat gateway 52 may be implemented as a hardware adapter for and/or a software module executed by VoIP gateway 54. Gateway 50 may be viewed as a network element in a larger communications network or system comprising, for example, PSTN 60 and network 20. It is contemplated that service providing system 30 may exercise control or carry out coordination of communications through one or more communications systems through a control interface by acting upon network elements other than a gateway such as gateway 50.

The composite gateway 50 may be more generally characterized as a novel form of network element having at least one messaging communications interface by which at least one action of the network element in a communications system is affected by the messaging communications. As part of its function in the communications system, the network element may carry or control telephony traffic or other forms of non-messaging traffic. In accordance with the present teachings, many aspects of the typical functioning of network elements may be controlled by messaging communications thereto. Some aspects of the transporting, routing and processing of communications traffic performed by network elements in the communications system that may be controlled or affected by messaging communications, which may even originate as natural language requests submitted via chat messaging, may include, for example, switching, routing, ingress, egress, multiplexing, demultiplexing, encoding, decoding, monitoring, translating, transforming, echo cancelling and other types of processing applied to traffic.

In accordance with one exemplary embodiment, intelligent chat gateway (ICG) 52 may be implemented as an adapter device to facilitate communications among messaging elements, such as chat client 14, and gateway 50 via a gateway control interface, such as along connection 53. Connection 53 represents a gateway control interface in that it is a point through which, for example, control information passes to the VoIP gateway 54 to cause it to establish connections. In FIG. 1, intelligent chat gateway 52 is shown to comprise messaging interface function 55, giving gateway 50 the ability to interface with IM service 22 in the role of a messaging participant, at least to some extent. Via connection 86, gateway 50 may perform communications with IM service 22 in the course of establishing communications involving any of connections 82, 84, 85, 76, 77, 75, and 78, as will be described below. Via messaging interface function 55, intelligent chat gateway 52 may coordinate with IM service 22 in establishing communications involving chat client 14. Such communications may be responsive to communications between service provider system 30 and ICG 52. For example, service provider system 30 may provide indication to ICG 52 that communications are to be established involving chat client 14. Service provider system 30 may also provide further information pertaining to said communications or may in fact issue commands to ICG 52 ultimately resulting in communications between ICG 52 and chat client 14 or between VoIP gateway 54 and chat client 14.

In response to requests by service provider system 30, for example, intelligent chat gateway 52 may cause VoIP gateway 54 to set up a call within PSTN 60 or establish a data path through network 20. With respect to ICG 52, connection 86 or connection 51 in conjunction with SPS 30 may be referred to as interfaces between ICG 52 and sources of messaging communications such as IM service 22 or chat client 14.

In order to provide a high quality voice connection, the requested calls are preferably completed through data network 20 utilizing a voice-over-packet data stream such as a data stream compliant with the Real-time Transport Protocol (RTP), which may rival a toll-quality telephone connection. The Real-time Transport Protocol is described in the Internet Engineering Task Force document RFC 1889. Other techniques for accomplishing transport of voice data, such as asynchronous transfer mode (ATM), frame relay or other types of transport may be readily applied to implementations of the present invention. While specific types of voice data transport are mentioned in describing exemplary embodiments, the present invention is not limited to using any particular transport.

In FIG. 1, this type of RTP connection is depicted by connections 82 and 84 through network 20. As with all of the other "connections" shown in FIG. 1, connection 82 represents the passage of information through network 20 in a general sense and may or may not be an actual connection in the formal sense of connection-oriented or connectionless styles of data transport. Connection 82 may represent one or more RTP-compliant pathways for data carrying voice signals among chat client 14 and VoIP gateway 54. Connection 84 may represent the passage of signaling communications to coordinate the creation of traffic bearing connection 82. Connection 84 may involve various call setup protocols such as elements of the ITU H.323 protocol suite or of the Session Initiation Protocol(SIP) described in IETF document RFC 3261. For example, to establish a "call" with chat client 14, VoIP gateway 54 might send a SIP "INVITE" message to chat client 14.

Alternatively, voice communications of lesser quality may be established if chat client 14 supports voice-enabled chat. Voice-enabled chat involves "best effort" transport of digitized voice signals through the data network and may involve delay, distortion, and interruptions in speech. Such impairments may be acceptable to some users under many circumstances. In FIG. 1, the creation of a voice-enabled chat session between chat client 14 and VoIP gateway 54 is represented by connection 86 and connection 85. Connection 86 is optional and may serve to allow gateway 54 to advertise its presence and locate chat client 14, although this may be unnecessary if contact information about chat client 14 is already provided to VoIP gateway 54 in the course of signaling between service provider system 30 and intelligent chat gateway 52 and along connections 51 and 53. Connection 86 may, in some implementations, also serve to carry ongoing communications among chat client 14 and VoIP gateway 54 using IM service 22 as an intermediary. It is also possible in some implementations that connection 86 may not be needed for either or both of initiating and carrying on communications and that connection 85 may serve as a direct connection for accomplishing either or both of these purposes.

A third alternative for communications among chat client 14 and VoIP gateway 54 involves translation between a textual interface at chat client 14 and an audio interface at VoIP gateway 54. In some embodiments, communication system 10 may further include an information translator, such as intelligent media translator 70, which may comprise one or both of a text-to-speech module 72 and a speech-to-text module 74 to convert between the text chat employed by chat client 14 and speech signals from telephones such as telephone 62. Text-to-speech module 72 in FIG. 1 may represent a text-to-speech process or function and may employ DECtalk™ speech synthesis technology developed by Digital Equipment Corporation, for example. Speech-to-text module 74 may represent a speech-to-text process or function and may employ any of the well known speech recognition technologies available from companies such as Nuance, SpeechWorks, International Business Machines or Dragon Systems, for example.

Intelligent media translator (IMT) 70 may comprise a port, connection or other interface for receiving speech signals, a speech-to-text conversion process for converting the received speech signals into corresponding textual information, and a port, connection or other interface for providing the textual information ultimately to a messaging client, such as chat client 14. Alternatively or additionally, intelligent media translator 70 may comprise a port, connection or other interface for receiving textual information from a messaging client, a text-to-speech conversion process for converting the received textual information into corresponding speech signals, and a port, connection or other interface for providing the speech signals through a communications medium, such as a telephone connection or RTP session.

For example, in FIG. 1, speech information from a caller using telephone 62 is carried through PSTN 60 and arrives as a conventional telephony signal at VoIP gateway 54. VoIP gateway 54 converts the received telephony media into a packetized data stream suitable for transport through a packet data network, such as data transport network 20. The packetized data stream may be directed to speech-to-text module 74 to convert the received speech signals into a textual representation. This textual information may then be sent to a text chat interface of chat client 14, perhaps in the form of a typical chat message, via network 20 and perhaps involving IM service 22. From the standpoint of chat client 14, IMT 70 may indeed 'appear' to be simply another chat client. An optional instant messaging sender 79a is depicted along connection 76 representing novel adaptation of the speech-to-text module 74 to carry on instant communications with chat client 14, although those of skill in the art will appreciate that such adaptation could be viewed as being a separate entity or being integrated into the function of IMT 70 or speech-to-text conversion process 74. In any event, by virtue of speech-to-text module 74, a user of chat client 14 will experience chat messages representing speech utterances from the party who is using telephone 62.

As used herein, "speech" may include spoken audio utterances as well as non-spoken audio information such as audible tones, signals or sounds which have meaning or significance that is commonly recognized or at least mutually agreed upon among communicating parties. For example, sounds of laughter, musical tones, sound effects, DTMF signals or other familiar audible sounds may communicate information or express thoughts and emotions. Embodiments of the present invention may advantageously include various aspects of recognizing, interpreting, and producing such sounds as a way of enhancing communications among parties. One practical application of this might be allowing a user of the system that generates textual information to interact with a voice processing system that is accustomed to receiving DTMF tones as input.

In the discussion of IMT 70, "text" or "textual information" may refer to, for example, symbols, characters and representations of visual or tactile elements which may or may not be actual words according to a given written or spoken language. Thus, it should be understood that text-to-speech module 72 and speech-to-text module 74 may operate to convert to/from audible signals other than spoken words and to convert to/from data representing information other than words.

In the context of facilitating communications among one party using an instant communications client and another party using a telephonic connection, a novel aspect of the present teachings relates to the manner in which symbols, known as "emoticons" and often appearing along with textual information, may be used to convey emotions, thoughts or impressions.

Because instant messaging sessions, especially chat sessions, may use a number of conventional abbreviations and so-called "emoticons", the speech-to-text module 74 and text-to-speech module 72 may employ special-purpose dictionaries (not shown) that list the proper equivalents for performing conversion among speech and text or symbols. For example, the commonly used "LOL" may be translated to the spoken equivalent of "laughing out loud" or to a sound effect that sounds like laughter. Dictionaries may be customizable to suit the preferences of communicating parties using system 10.

IMT 70 may act to recognize sounds and render, in the conversion performed by speech to text module 74, textual or symbolic representations that correspond to the sounds according to some conventional or desired mapping. For example, the spoken words "laugh out loud" or even the detection of sounds of laughter from one party may evoke a textual "LOL" or the like which is conveyed to the other party who is using a textual interface. Further, to aid such detection or provide more deliberate control for communicating parties, IMT 70 may be receptive to verbal commands and command delimiters indicating that a sound or spoken utterance is to be interpreted according to this feature rather than interpreted as literal words. For example, a party may say "insert" or "emoticon" followed by a desired expression such as "laugh", "frown", "puzzled", etc. Upon recognizing such a keyword, IMT 70 will interpret adjacent sounds and map the sounds detected into appropriate symbols to be sent to another party.

In performing conversion, IMT 70 may be receptive to other signals such as DTMF signals. While communicating through IMT 70, a party using a telephone may be able to press digits on a dialing keypad to have specific emoticons or other symbols included in the textual output of the conversion module. For example, a "smiley face" representation may be sent to an instant communications user in response to a telephony user entering a sequence such as "#8" or "486", the latter of which follows the shape of a smile on a standard 12-key touch-tone keypad. DTMF tones may also be used to implement recognizable command delimiters in the context of the previous discussion.

In the course of converting speech and other audible signals into corresponding symbols or text, IMT 70 may also perform translation among different spoken and written languages, for example, converting English text to Spanish speech and vice-versa. The decision to invoke this type of conversion may be performed dynamically in response to input from the parties as the communications is established. Alternatively, language preferences or compatibilities of one or both of the parties may be known or maintained in a profile database or expressed by devices, such as chat client 14, to affect how IMT 70 handles the communications. Language conversion may be provided as an option to users and, from a commercial standpoint, may be offered at an additional charge to offset costs or provide a profitable operation for a service provider.

As IMT 70 performs conversion, the manner in which each party perceives the other party may be affected by the interaction through the translator. For example, a male party using an instant communications client, such as chat client 14, will likely prefer that any synthesized speech representing him to a telephony user be rendered in a male voice. Other aspects of speech rendering, such as approximate speaker age, vocal characteristics, inflection and local dialect may be alterable or configurable and may be adjusted dynamically or according to, for example, a profile maintained for a given user. In some implementations, a party might elect to use a speech persona that is whimsical or that emulates the characteristics of a popular recognizable personality. Users may pay a premium to a service provider for the use of such custom services.

Another aspect of how one party "experiences" another party relates to the identifying of the parties to one another, particularly to the party who is using an instant communications client of some nature. In conducting messaging communications, for example, one party will see chat messages coming from another party, the chat messages having actually been composed by speech-to-text module 74 based upon speech input from the other party. The apparent screen name of the remote party may be subject to control dynamically during the establishing of communications or may be affected by a profile of user preferences consulted by system 10 in the course of providing the communications service. According to various implementations, the presentation of remote user identity to the messaging user may comprise a screen name, an image or iconic representation, a sound bite or other presentable element. The manner in which a given party wants to be presented to a remote party may be the subject of interaction with an operator or interactive service providing system during or preparatory to the establishment of communications involving the parties. A service provider may optionally assess billable charges to one or both of the parties related to the provisioning, use or invocation of some of these presentation features.

In the matter of coupling IMT 70 to chat client 14, connections 76, 77 may be implemented as communications through network 20 even though, for simplicity, they are shown as direct connections in FIG. 1. Moreover, connections 76, 77 may be manipulated through session router 32. That is, similar to the manner in which session router 32 accomplishes transfer among messaging stations within SPS 30, session router 32 could cause communications from chat client 14 along connection 24, for example, to merely be redirected to IMT 70. The advantages of doing this are that the user of chat client 14 experiences continuity of the original session and that a respondent in SPS 30 may stay conferenced onto the subsequent communications, perhaps in order to facilitate the initial communications with a second party.

In similar fashion, text-to-speech module 72 may act as a chat entity involved in chat communications with chat client 14. An optional instant messaging receiver 79b is shown along connection 77 for adapting text-to-speech module 72 to act as a recipient instant messaging client. As with sender 79a, receiver 79b may be implemented as, or at least conceptually viewed as, being either separate from or integral with IMT 70 or text-to-speech conversion process 72. Sender 79a and receiver 79b may in fact be implemented as a single messaging process, similar to the manner in which chat client 14 conducts communications through connection 24, and may carry out both sending and receiving through a single network address and port number. When a connection is established through VoIP gateway 54 and intelligent media translator 70, a party using telephone 62 will hear synthesized speech representing chat messages as they are received from chat client 14.

Although not explicitly shown in FIG. 1, the passage of packetized telephony signals along connections 75 and 78 may imply packet assembler/disassembler and codec interfaces for adapting conversion processes in modules 72 and 74 in a novel manner to support the present teachings. It should be noted that connections 75 and 78 may represent other forms of bearer channel connection, such as TDM signals directly from a telephony network such as PSTN 60. In the pursuit of coupling a telephony party at telephone 60 or IP telephone 92 to chat client 14 through IMT 70, the voice signals may traverse a data transport network (using RTP, for example) or a telephony network (in the form of analog or TDM signals) or a combination of transport networks. The design of IMT 70 may vary accordingly to work with telephony signals in the appropriate form. The use of RTP to carry voice signals to/from IMT 70 as shown in FIG. 1 is thought to be advantageous for compatibility with VoIP gateway 54 and its ability to alternatively carry on RTP communications directly with properly equipped chat clients 14.

In FIG. 1, intelligent media translator 70 is shown to further comprise at least one controller 73 that may interface to, or be in communication with, either or both of intelligent chat gateway 52 and service provider system 30 as represented by connections 80. Controller 73 may be operable to receive instructions or commands from service provider system 30 or intelligent chat gateway 52 for purposes of coordinating connections such as RTP voice communications along connections 75 and 78 and textual communications along connections 76 and 77. Controller 73 may participate in allocating resources of text-to-speech module 72 or speech-to-text module 74 and in determining addressing or port numbers by which such modules are engaged in communication with other elements. In some embodiments, controller 73 may issue commands or information along connections 80 causing either or both of service provider system 30 and intelligent chat gateway 52 to establish communications involving intelligent media translator 70.

Via controller 73 or the like, intelligent media translator 70 may provide a control interface means suitable for communicating various types of information in the course of arranging communications through the intelligent media translator. Some example types of information which may be communicated through the interface include: an identifier corresponding to the messaging client, an identifier corresponding to an RTP stream, an IP address, an identifier corresponding to a speech signal input port of the translator, an identifier corresponding to a speech signal output port of the translator, an identifier corresponding to a textual information receiving port of the translator, an identifier corresponding to a textual information output port of the translator, an identifier corresponding to a session involving the translator, an identifier corresponding to an instance of the speech-to-text translation means, and an identifier corresponding to an instance of the text-to-speech translation means.

It should be noted that a called party participating in communications through a telephony connection, such as through an RTP voice-over-packet session directly with chat client 14 or through IMT 70 may carry out a communication vocally through a phone and without having to compose discrete messages. In other words, messaging or other instant communications among a principal using chat client 14 and system 10 may give rise to yet other communications wherein at least some of the latter communications do not involve messaging or wherein at least one of the communicating parties does not have to compose and send discrete messages.

In FIG. 1, service provider system 30 is also shown to be coupled to PSTN 60 via connection 56, representing a coupling to any form of public or private telephone network. Service provider system 30 may engage in telephony signaling or otherwise coordinate with telephony systems and switches in providing services to principals. Furthermore, connection 71 shown coupling PSTN 60 to IMT 70 represents a telephony connection, such as telephone line or trunk, by which IMT 70 may communicate telephony signals with a telephone network. As described further below, connections 56 and 71 allow for a variety of interactions or cooperation with a telephone network. For example, wherever it is described that gateway 50 causes chat client 14 to communicate with telephone 60, it should be understood that an analogous functioning through connections 56, 71 and PSTN 60 may similarly accomplish a connection of the parties involved.

Those of ordinary skill in the art will recognize that various elements depicted in FIG. 1 may be combined or separated while still accomplishing the same general operation described herein. For example, the function of intelligent media translator 70 may be integrated with VoIP gateway 54 forming a novel gateway device or subsystem capable of interfacing directly between a telephone network and a chat client. Those of ordinary skill will also recognize that, given the exemplary embodiment described in FIG. 1, a variety of techniques and sequences of events may be used to coordinate the formation and dissolution of communications among various elements and that a variety of signaling or control connections may be added to enable each element to receive or originate "call setup" instructions. To carry out the functions described herein, one or more of the elements shown in FIG. 1 may be coordinated in their actions using one or more controllers, such as by employing a softswitch technology as recommended by the International Softswitch Consortium or a control arrangement as described in U.S. Pat. No. 6,098,094. For example, a controller 90 may be coupled to any or all of the elements in FIG. 1 through network 20 or by a separate network or point-to-point connections. As will be apparent to persons of ordinary skill in the relevant art, controller 90 may send signals to various elements through network 20 to accomplish functions described herein.

Such conversion between chat text and voice signals may be desirable or necessary if, for example, an intranet security firewall through which chat client 14 communicates is configured to block streaming IP sessions of the type utilized to carry voice communication or because a particular chat client 14 or data processing system 12 does not support voice communication (e.g., is not equipped with a microphone).

Figure 3:
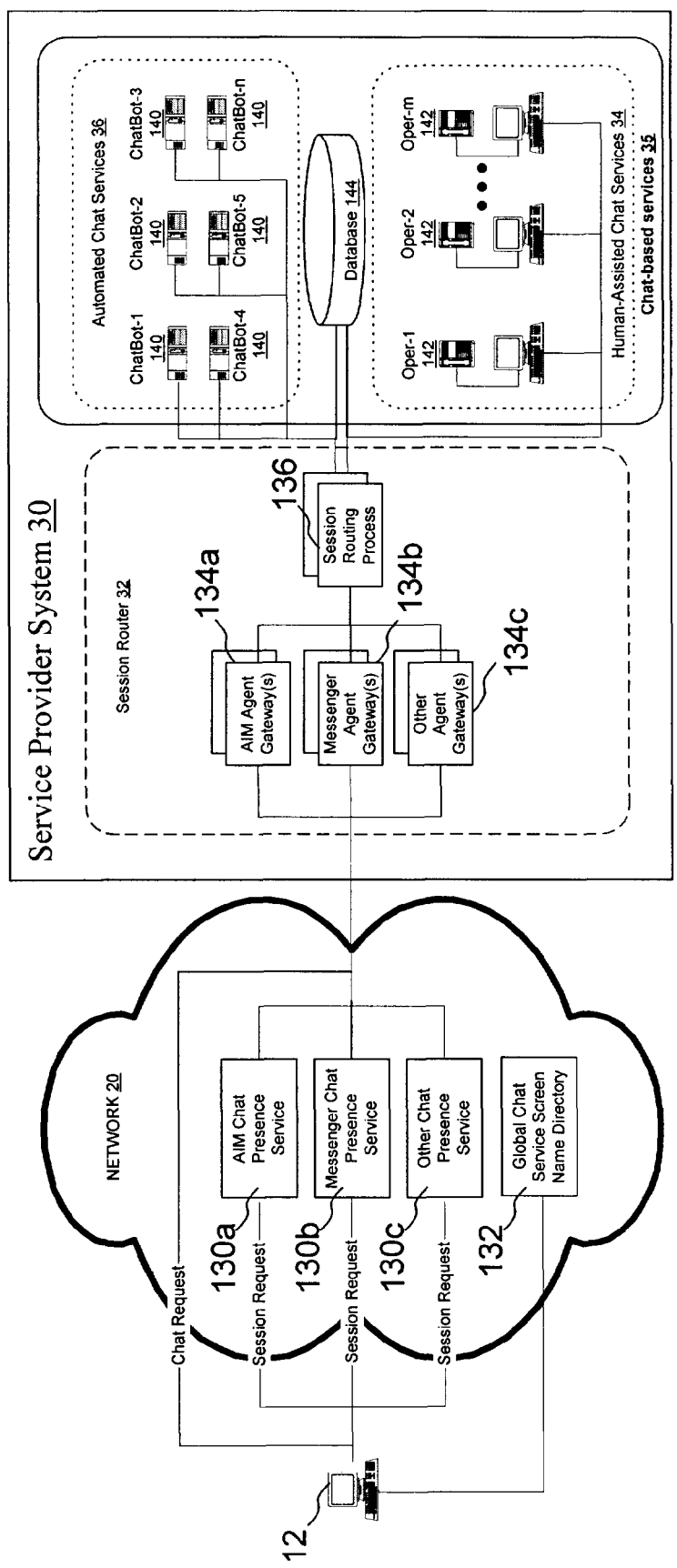
FIG. 3 illustrates a more detailed depiction of the network and service provider system of the communication system shown in FIG. 1.

With reference now to FIG. 3, there is illustrated a more detailed depiction of network 20 and service provider system 30 (as were introduced in FIG. 1) in accordance with one embodiment of the present invention. As shown, network 20 comprises or is coupled to a number of instant messaging servers 130a-c representing different instant messaging services (e.g., AIM, MSN® Messenger, Yahoo!® Messenger, etc.). As mentioned earlier, depending on implementation, each instant messaging service may or may not stay involved in forwarding of chat messages after a session among parties has been initiated. Each instant messaging server 130 may provide presence functionality and, in some cases, presence may be the principal function contributed by the server.

Network 20 may optionally include, or be coupled to, a global chat service screen name (CSSN) directory 132, which a user can access through chat client 14 to learn the CSSN(s) of a service provider. CSSNs learned from global CSSN directory 132 can then be utilized to initiate chat sessions and can be selectively added to the friends list 120 of chat client 14, as described above. Depending on availability of screen names, the CSSN for a given service may be common across all of the instant messaging service providers or may be somewhat different among providers, perhaps encouraging the use of directory 132. Generally, throughout the present description, references to 'CSSN' should be understood to mean either or both of the global chat service screen name as described above or a screen name for the chat-based service as it is known in the context of a particular instant messaging service. Both of these are screen names by which the service may be known and accessed in one way or another.

As further illustrated in FIG. 3, service provider system (SPS) 30 includes chat-based services system 35 and an optional session router 32, which provides an interface between network 20 and chat-based services system 35. By virtue of chat-based services system 35, SPS 30 may be referred to as being, or at least comprising, a messaging response system. Chat-based services system 35 may provide both human response through zero or more (in this case, 'm') operator messaging stations 142 and automated response through zero or more (in this case, 'n') automated messaging stations (referred to herein as 'chatbots') 140. The chat-based services provided by messaging stations 140, 142 can include, without limitation, any of the over a hundred services now provided by telephony operator services (e.g., telephony directory assistance, call completion, customer support, concierge services, etc.) or other services not traditionally offered by telephony operator services (e.g., chat directory assistance, information retrieval services, interactive web browsing assistance, etc.).

In a first embodiment in which session router 32 is omitted, each messaging station 140, 142 has a different CSSN (and perhaps a different CSSN for each instant messaging service) to enable peer-to-peer communication between chat clients 14 and particular messaging stations 140, 142. Each station 140, 142 may log on to one or more instant messaging services. Chat clients 14 may become aware of one or more CSSNs by which to reach chat clients for a particular purpose. CSSNs for stations 140, 142 may, for example, conform to a generic name followed by a specifier such as "DirAsst67." The provider of services could make known to prospective users that a screen name of "DirAsst" followed by any two or three digits will reach a chat agent offering a given service. On average, each of the stations having screen names "DirAsst01" through "DirAsst99" will receive an approximately equal volume of requests, especially if users are encouraged to use randomly distributed numbers such as the last two digits of their telephone number or government-issued personal identification number. If a station becomes overloaded with requests and does not respond in a timely fashion, users may try a different screen name in the same "family" of screen names but having a different suffix.

Alternatively, a directory may be provided by which a user may obtain from a service provider a screen name to be used temporarily. This is comparable to presence functionality except that the available status of an exact screen is not being obtained. Instead the user may request using a generic screen name and receive a specific, currently available screen name.

An interface by which the user might obtain a temporary screen name might itself be through a chat session with a service provider using a consistent screen name. For example, a user might contact a screen name of "DirAsst" advertised by the service provider to be a source for information. The chat session with "DirAsst" might provide a response to the user of a screen name of an available chat respondent at a more specific address such as "DirAsst34". The user may then begin a chat session with "DirAsst34" freeing up "DirAsst" to route other initial requests to other stations.

In a slight variation on this approach, the request to "DirAsst" might immediately be delegated to another respondent such as a station 140, 142 in system 30. Sufficient information about the requesting chat client gleaned from the initial chat request may be passed along to a subordinate station which could then engage the requestor. The principal who initiated the request addressed to "DirAsst" might soon receive back a response from "DirAsst45" or "Operator6" or any other screen name corresponding to the assigned station.

These approaches are advantageous for permitting the service provider to maintain any number of stations at any given time, as opposed to having exactly a hundred or a thousand different chat respondents online at all times. Such approaches also allow for dynamic distribution among stations under the control of the service provider.

In accordance with another embodiment of the present invention, multiple (and preferably all) stations 140, 142 utilize a common CSSN for each distinct service offering (e.g., "Call Services" and "Concierge" from FIG. 2), so that multiple users of possibly different instant messaging services can concurrently conduct private chat sessions with multiple stations 140, 142 under a common CSSN. Thus, users are afforded the convenience of a single CSSN to learn and remember for each service offering (or even multiple service offerings), much like the provision of telephone collect call completion services by dialing the telephone number "1-800-COLLECT." In order to support sharing of a CSSN by multiple stations 140, 142, the second embodiment includes a session router 32 interposed between chat-based services system 35 and network 20 to distribute chat requests addressed to a single CSSN to multiple stations 140, 142. Session router 32 may accomplish the 'conferencing' of multiple chat services and/or stations 140, 142 into the same chat session. In addition to routing chat requests to chatbots 140 and operator stations 142, session router 32 can facilitate the transfer of a chat session from one respondent station to another or from one chat-based service to another chat-based service. Session router 32 may be involved in routing communications to other service providers, such as to a service provider operating a bank of chat respondents similar to SPS 30. Session router 32 or SPS 30 may also be able to route communications to external resources such as to telephony communications or to a service providing system that is accessible by telephone.

A first party and a second party may address requests to the service providing system, with the request from either party being addressed to a common screen name or other identifier specifying the service providing system. Furthermore, each party accessing the service providing system receives responses that appear to come from the generic screen name by which each party addressed communications to the service. In other words, a first party who initiated communications using a screen name like "Concierge" will receive responses wherein the sender identifier of the message will similarly read "Concierge". Both a first party and a second party using the service will receive responses having the same sender identifier. Both parties will experience communicating with "Concierge" even though they may in fact be conversing with different messaging stations 140, 142 within service providing system 30. Session routing process 136 operates on both inbound request messaging and outbound response messaging to accomplish this transparency.

Aside from the transparency experienced by the requester through chat client 14, this approach is advantageous for "hiding" the screen names of individual stations and blocking attempts by outsiders to reach a particular station each time they access the system. A novel aspect of session router 32 is that, in contrast to typical IM messaging approaches, it routes inbound messages based on the identification of a chat client 14, or a party using same, rather than the recipient address contained in the message. Of course, in the scenario just described, all inbound messages will have the same recipient address, namely the CSSN corresponding to SPS 30. Thus, the choice of which messaging station in chat-based services system 35 receives an inbound message is determined by the session router and not by the party who sent the message.

In the depicted embodiment, session router 32 includes a plurality of agent gateways 134a-c, which each provide an interface for a respective instant messaging server 130. Agent gateways 134a-c make transparent the presence of messaging station(s) 140, 142 providing service to users. It is possible to implement stations 140, 142 as one or more processes distributed on one or more computing devices, even through geographically distributed systems and/or Web services.

As indicated in FIG. 3, in order to service a large number of concurrent requests, multiple instances of each type of agent gateway may be instantiated, with load balancing techniques implemented to manage traffic between these instances of each agent gateway 134a-c. This approach may be also advantageous in implementations employing geographic redundancy to improve system survivability.

Each gateway 134a-c acts as a chat client with respect to a particular instant messaging or presence service. The use of different gateway types is necessitated by the diversity of proprietary instant messaging technologies used by services via servers 130a-c. Each service 130a-c represents a particular 'brand' of instant messaging service or presence service or combination thereof. There is as yet no common standard by which servers 130a-c may interoperate. If and when such interoperability is achieved, alternatively or additionally, a "universal" agent gateway may be implemented to support communication with two or more instant messaging services that employ a common instant messaging protocol. Each agent gateway 134a-c translates communication between the instant messaging protocol employed in communication with data processing system 12 via network 20 and a common internal protocol (e.g., IP, a standards-based messaging protocol or a proprietary messaging protocol) employed within service provider system 30 for communication between session router 32 and chat-based services system 35. Although most chat communication is stateless and unencrypted, the various instant messaging protocols may further require the associated agent gateways 134*a-c* to manage state information and accommodate security implementations, such as encryption, certification, etc.

Session router 32 further includes one or more instances of a session routing process 136 (described in detail below) that routes inbound communication received from agent gateways 134*a-c* to selected stations 140, 142 for servicing. Session routing process 136 also routes outbound communication received from stations 140, 142 to the appropriate agent gateway 134*a-c* for transmission to a chat client 14.

As evidenced by connections 24 and 25 of FIG. 1 and by agent gateways 134*a-c* in FIG. 3, session router 32 provides a messaging system interface operable to communicate messaging communications among a message response system and parties accessing services provided by the message response system.

Figure 4:
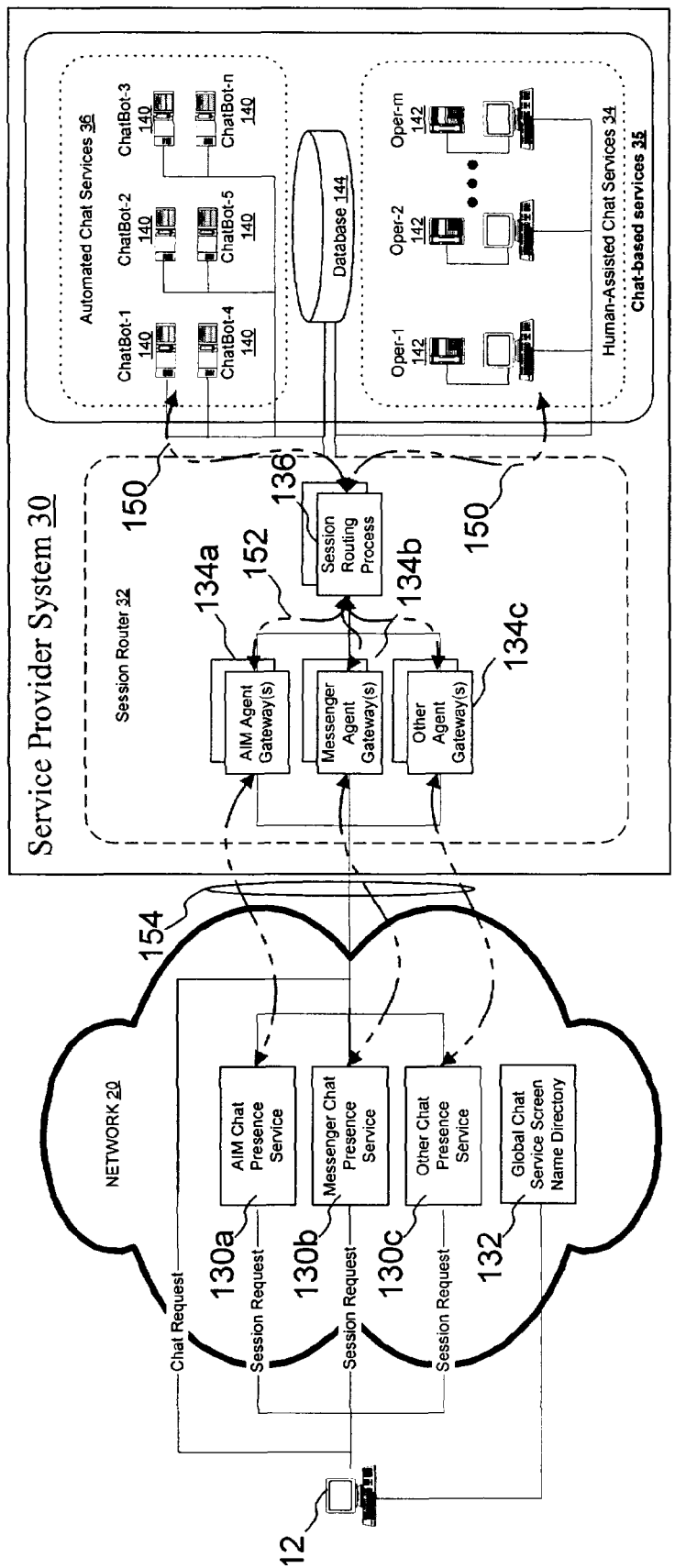
FIG. 4 depicts an exemplary method by which automated and human-assisted stations within the service provider system of FIG. 3 register presence of a chat-based service screen name with an instant messaging service.

Referring now to FIG. 4, there is depicted an exemplary method by which service provider system 30 registers with one or more instant messaging service providers 103*a-c* to inform them that a chat-based service screen name (CSSN) is online and available to provide service. As indicated at reference numeral 150, when each station 140, 142 within chat-based services system 35 becomes available for service, typically on system start up, the station 140, 142 will register its unique name(s) (e.g., logical name, numerical ID or network address) and its associated CSSN(s) (if more than one CSSN is used) with session routing process 136.

As part of this registration process, the station may also inform session routing process 136 about its capabilities. The capabilities about which a station may inform session routing process 136 include, for example, languages supported, services provided, concurrent sessions that can be serviced, instant messaging (IM) services and media types supported, service costs, etc. As depicted in FIG. 5A, session routing process 136 enters this information in fields 164, 166, 167 and 168 of a corresponding registration table entry 162 of a registration table 160 (or other data structure) maintained by session routing process 136. It should be noted that a station may re-register at anytime to inform session routing process 136 of new or changing capabilities, for example, to dynamically update the number of concurrently supported sessions or services that can be provided.

Based upon the registration of stations with the session routing process, a particular messaging station may be selected to be associated with a given party who is communicating with the service providing system. This selection may take into account, for example, availability information relating to availability of the messaging station as reported to the session router, activity level of the messaging station, suitability of the messaging station to communicate with the party, resources available to the messaging station, capabilities of the messaging station, prearranged association of the messaging station with the party, and an attribute of the party meeting criteria for being handled by the messaging station. The prearranged association may relate to providing personalized services as described earlier in conjunction with FIG. 2. Furthermore, some of the criteria or suitability aspects may relate, for example, to which language a party wishes to use and which stations are able to converse in the desired language. Some criteria or suitability aspects may relate to gender, personality, personal attributes or preferences on the part of the party being serviced or the respondent. This may even extend to the willingness of the respondent at a messaging station to engage in certain types of interactions or services.

Availability status of each station 140, 142 may be presented in status information field 167 of entries 162 in registration table 160. For example, the values in this field may represent that a given station is available for handling new sessions, is unavailable or is fully occupied with handling sessions. This information, along with information in capabilities field 166, may be used in deciding how to allocate stations to handle sessions.

Utilizing fields 167, 168 of registration table entries 162 within registration table 160 (or other suitable tracking mechanism), session routing process 136 in FIG. 4 preferably tracks which of the one or more CSSNs employed by stations 140, 142 within chat-based services system 35 are logged into the various available instant messaging services. Alternatively, login status within the various instant messaging services may be maintained by agent gateways 134*a-c* or determined by polling each presence service of servers 130*a-c*. Session routing process 136 may also pass this login status information back to stations 140, 142 if desirable or required by stations 140, 142.

It may be preferable in many implementations to have each station 140, 142 be able to handle sessions pertaining to multiple CSSNs. A stations may be able to support agility among multiple CSSNs or may even be able to concurrently handle sessions arising from multiple CSSNs. It is particularly noteworthy that each station may also be able to conduct sessions with multiple parties who are accessing the service using different ones of instant messaging services 130*a-c*. Moreover, by virtue of session routing process 136 resolving session identification based on both chat client address 173 and CSSN 174 in table 170, a given party accessing the system may be simultaneously serviced by one or more stations 140, 142. For example, a principal may use two different services accessed using two different CSSNs, yet within the service providing system the sessions are routed independently of one another regardless of the common chat client address. The principal accessing the service may not be aware that both sessions are being serviced by the same service providing system or perhaps even the same respondent station.

When session routing process 136 determines that a CSSN utilized by a station 140, 142 is registering with session routing process 136 and is not currently logged into an instant messaging service, session routing process 136 sends a login request to the associated agent gateways 134*a-c*, as indicated at reference numeral 152 of FIG. 4. Generally, in response to one or more stations indicating availability to agent gateways 134*a-c*, the agent gateways 134*a-c*, utilizing the appropriate protocol(s), will each log in to their respective instant messaging services using the CSSN(s) for which the service provider is then receptive to sessions from users. This action is depicted at reference numeral 154. In embodiments in which more than one instance of an agent gateway 134*a-c* is provided for at least one instant messaging service, it is preferable that only one instance of a particular agent gateway 134 (e.g., selected by default or arbitration) logs a CSSN into the associated instant messaging service. Otherwise, a login attempt may fail or cause the instant messaging service to disconnect a previously logged in agent gateway 134 sharing the same CSSN for that instant messaging service.

Figure 6:
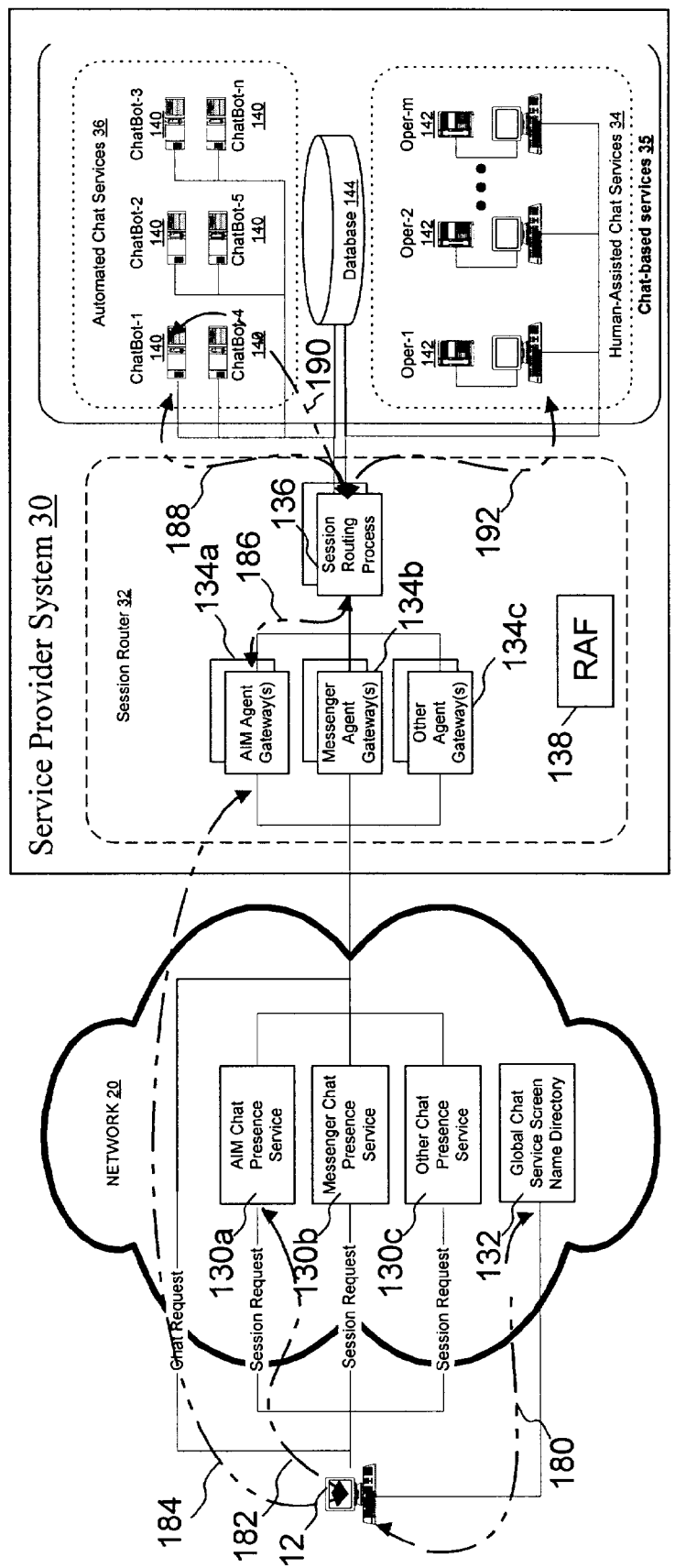
FIG. 6 depicts an exemplary scenario by which a chat client accesses chat-based services in accordance with the present invention.

With reference now to FIG. 6, there is depicted an exemplary chat message flow by which a principal associated with chat client 14 can access a chat-based service provided by service provider system 30 in accordance with the present invention. In order to access a chat-based service, the principal associated with chat client 14 will first need to learn the CSSN associated with the desired service. For example, as illustrated in FIG. 2, the CSSN "Call Services" could be assigned to a chat-based service providing directory assistance, call completion, and other related services, and the CSSN "Concierge" could be assigned to chat-based concierge services (e.g., providing accommodation and restaurant reservations). As noted above, and as shown generally at reference numeral 180, the principal can learn the CSSN of a desired service by consulting global CSSN directory 132 or other directories, accessing a default entry in friends list 120, receiving an advertisement, selecting a web site link, etc. For example, a service provider may use television, radio, web banners, billboards or the like to advertise a screen name for users to access a particular service. Ideally, enhancements to existing web-based directory services and/or global CSSN directory 132 might incorporate features to enable the lookup of CSSNs based upon criteria such as service category, service provider, cost, user ratings, etc.

The principal then initiates chat communications with the CSSN associated with the desired service, for example, by selecting a CSSN from friends list 120 and then selecting chat button 112 within messenger window 100 of FIG. 2. As indicated in FIG. 6, chat client 14 responds to the principal initiating a chat session by sending a session request 182 to the presence service 130 of the instant messaging service configured for chat client 14. If the presence service 130 indicates that the CSSN is logged into the presence service 130, for example, by returning a network address associated with the CSSN, chat client 14 will send a text or voice chat request 184 to the network address returned by the presence service. The address associated with the CSSN will direct the chat request to the appropriate agent gateway 134 within session router 32. For example, if the user has an AIM chat client, the chat request may be directed to AIM agent gateway 134a. As mentioned before, some instant messaging systems handle all messaging traffic whereas others merely participate in the initial establishment of messaging sessions. Still others operate in an entirely peer-to-peer fashion without involving intermediary messaging servers. Those of ordinary skill in the art will recognize that the present invention may be embodied in the context of any of these forms of messaging systems. For example, in homogeneous environment where a single messaging system or messaging protocol is to be supported, such as in a private enterprise, same of the elements and practices described herein may be omitted or suitably modified.

As discussed above, in response to receipt of chat request 184, agent gateway 134 may optionally translate chat request 184 into a translated chat request that complies with the internal messaging protocol employed by service provider system 30, and session routing process 136 routes the translated chat request to one or more stations 140, 142 for servicing, as generally indicated at reference numeral 188. As discussed above, the provided service may be any of a myriad of services, and will typically entail the transmission of a text or voice chat response message from a station (e.g., chatbot-1 140) to chat client 14, as indicated at reference numerals 190 and 186. This chat response message may convey information sought by the chat request (e.g., a telephone number, chat screen name or other contact information) or may convey acknowledgement (completion) or refusal of the chat request. It should also be noted that the chat response may be in a different format than the chat request (e.g., a text chat response to a voice chat request).

To determine how to route inbound messaging to respondent stations 140, 142 and route responses to appropriate agent gateways 134a-c, session routing process 136 may consult routing association function 138 to obtain routing information. Routing association function (RAF) 138 may implement a variety of techniques for establishing an association between a messaging station and a party who is using the service providing system 30. For example, routing association function 138 may comprise, or have access to, routing table 170 and/or registration table 160. Routing association function 38 may apply selection criteria to decide which messaging station is to handle each inbound communication session. A routing association manifested in routing association function 138 may act by associating an identifier for a party with a messaging station identifier. An identifier for a party may be, for example, a screen name by which the first party is known in an instant messaging system, a network address for a messaging client used by the first party, an account name, an account number, and a user name by which the first party is known to the messaging response system. Routing association function 138 may comprise any or all of: a data structure for storing routing associations, a process for determining routing associations and means for accessing routing association information from another source.

In some cases, session routing process 136 may also transfer a chat session to another station or "conference in" an additional station (e.g., Oper-1 station 142) to service the chat request, as generally illustrated at reference numeral 192 and as discussed further below. To facilitate the servicing of chat requests by multiple stations sequentially or concurrently, session routing process 136 and/or stations 140, 142 will maintain enough state information for each chat session within database 144 so that any session can be transparently transferred to another station 140, 142 at any point during the chat session. The need to transfer the session could arise due to system failures, load balancing, requests for functionality not offered by the current station, etc. One common reason to transfer control of a chat session may be the need for chatbot 140 to invoke service by a human-assisted station 142. Such transfer, as well as addition or deletion or other changes to routing, may be initiated by chatbot 140, by the user at chat client 14, by an operator at a human-assisted station 142, or under programmed control of some nature operating within system 30 or chat-based services system 35. Another possible participant in the transfer, conferencing or control may be a third party associated with SPS 30, such as a supervisor at a supervisory station therein. Transfer or conferencing may also involve a party outside of SPS 30, such as another service providing system similar to SPS 30 or even a call center, operator or help desk which are accessible by telephone. Conferencing, transfer or referral involving a telephone-accessible entity may be accomplished via, for example, connections 56 and 71 shown in FIG. 1.

Session routing process 136, for example by the action of routing association function 138, may be caused to add another station by creating multiple routing association records 172 mapped to the same chat client address 173. Deleting a routing association corresponds to deleting a record 172 within routing table 172. Reassigning a different messaging station to handle requests from a given party (such as when human operator intervenes and replaces an automatic respondent during a session) may be accomplished by adding a routing association in the form of a new record 172 and then deleting the former routing association record.

It should be noted for the sake of clarity that instant messaging sessions are typically stateless interactions. Elements involved in handling messaging communications generally do not maintain state information. For example, delivering a given message does not depend upon the messaging system recalling any information related to previous messages having been sent. The concept of session state information described herein does not imply any change to the stateless nature of conventional chat sessions from the perspective of chat clients and instant messaging services, nor does it exclude a modification of instant messaging to include notions of state.

In some instances, it may be desirable to provide for storage of session information. This may be useful for conveying information from one station to another as a session is transferred. This may be also useful for sustaining a session even if a service within service providing system 30 is momentarily disrupted. Examples of session information to be stored may include an identifier associated with a party, state information related to the communications session with the party, degree of progress through a programmatic sequence of steps performed by the messaging response system, copies of at least portions of messaging communications, information obtained from the party, information requested by the party, information pertaining to the party, information obtained from a database responsive to communications with the party, information pertaining to a messaging station, and pointers, links, handles, indices and other references to places where additional data may be obtained. These same types of information may also be passed directly between stations with or without being stored in a database. This same information may also be useful for such purposes as billing, fraud prevention and collection of operating statistics.

Referring now to FIG. 7, there is illustrated a high level logical flowchart of an exemplary method by which the session routing process 136 of FIG. 6 routes communication between agent gateways 134a-c and stations within the chat-based services system 135 in accordance with a preferred embodiment of the present invention. In the depicted embodiment, session routing process 136, which can be implemented in hardware, software or a combination thereof, routes such communication by referring to the routing table 170 shown in FIG. 5B.

As described earlier, routing table 170 may be generally characterized as a routing association means, with each record therein representing a routing association between a messaging station and a party accessing the chat-accessible services. It is contemplated that a variety of alternative data structures or algorithmic approaches may be used to represent, determine and manipulate such routing associations that cause communications from a party to be routed to a particular messaging respondent station. Process 700 is a method of managing messaging communications and may be implemented as a software process represented by instructions on a computer-readable medium.

In FIG. 7, process 700 begins at step 701 in response to session routing process 136 receiving a message, such as from an agent gateway 134 or station 140, 142. In the depicted embodiment, the internal communication protocol employed within service provider system 30 includes at least three types of messages: chat requests by chat clients 14, chat responses by stations 140, 142 and control messages. Upon receipt of a message in step 701, processing then continues with step 702, wherein it is determined if the message is a chat request from a chat client 14 received from an agent gateway 134. If so, then execution proceeds to step 712 to determine if the chat request represents a new session. This determination may involve examining routing table 170 for entries having the same chat client address 173 as the inbound message.

If such an entry is found, signifying that there already exists a session and a station associated with the requesting party, then execution proceeds to step 716 wherein the chat request received in step 701 is matched to one or more entries 172 in routing table 170 based upon preferably both the chat client address and CSSN. Accordingly, the message is then forwarded to the appropriate station(s) as indicated by corresponding servicing station address 176 in routing table 170. Multiple entries for stations servicing the same chat client address may occur when stations perform conferencing, such as when a human-operated station becomes involved in a chatbot session. After dispatching the chat request to the assigned station, execution of process 700 terminates at step 730 denoting completion of handling the communication that was received in step 701.

Returning to step 712, if no entry 172 having a matching chat client address 173 and CSSN is found, then it is assumed that the message represents a new chat client that is not already associated with a session or station in service provider system 30. In this case, execution proceeds to step 714 to select a station to be assigned to the originating chat client for handling the current request and any subsequent requests. The selection of a particular station from among a pool of stations 140, 142 may take into account many factors, such as the current workload, current availability and suitability of each station. Session routing process 136 selects from registration table 160 a station 140, 142 to service the chat request based on one or more factors, such as type of request, service cost, workload balancing, system availability, feature sets, system capabilities, operator skills, etc.

The selection of a particular messaging station from among a pool of stations 140, 142 may be responsive to at least one of: availability of the messaging station, activity level of the messaging station, suitability of the messaging station to communicate with a given party, resources available to the messaging station, capabilities of the messaging station, prearranged association of the messaging station with the party, and at least one attribute of the party meeting criteria to be handled by the messaging station.

Upon selecting a station in step 714, the process continues to step 704 wherein a new entry 172 is added to routing table 170. Session routing process 136 then enters the network address or identifier of the selected servicing station and an assigned session ID into fields 176 and 177, respectively, of the routing table entry 172. The chat client address field 173 of the entry is populated with the chat client address of the inbound message. The CSSN corresponding to the chat client is entered into CSSN field 174 of entry 172. The address or identity of the appropriate servicing agent gateway 134 is recorded in servicing agent gateway field 175.

These actions accomplish an associating or "binding" of the station with the session and the requesting entity. Thereafter, process 700 continues at step 716 and the chat request received in step 701 is forwarded to the newly associated station based on the updated contents of routing table 170. The process thereafter terminates at step 730.

Returning to step 702, if the message received by session routing process 136 is not a chat request, then execution proceeds to step 706 to determine whether the message is a chat response coming from a station 140, 142 and intended for a chat client 14. If the message is a chat response by a station 140, 142, the process proceeds to step 708 wherein session routing process 136 accesses routing table 170 and inserts the network (e.g., IP) address of the chat client (and optionally the CSSN) into the chat response, if necessary. Of course, in embodiments in which session routing process 136 passes the network addresses of chat clients to stations 140, 142 and stations 140, 142 mirror the chat client addresses in chat responses, session routing process 136 need not insert a chat client network address into the chat response as shown at step 708. Then, in step 710, the chat response is routed to the appropriate agent gateway 134. The agent gateway 134 handling the chat session in turn forwards the chat response to the appropriate chat client 14.

Optionally, in step 708, an additional search may be made for other entries 172 having the same chat client information and determining if other stations are in communication with the given chat client. To accomplish a chat conferencing function, a response to be sent to the chat client may also be copied to other stations found by this search. Depending on how this is implemented, such conferencing may or may not be bilateral. In some instances, for example, it may be desirable to suppress messages from a human operator 142 echoing to a chatbot 140.

Returning to step 706, in the event that the message received by session routing process 136 is not a chat request or chat response, the process proceeds to step 720 and subsequent steps which depict session routing process 136 processing a control message. In the depicted embodiment, such control messages include at least requests by stations to reassign chat sessions to different stations and end-of-session notifications. As indicated by step 718 labeled "Other Processing", the communication protocol involving session routing process 136 may also include other control messages or chat messages not explicitly described herein.

If, in step 720, it is determined that a received control message is a request to reassign or transfer the session to another station, the process proceeds to step 722. At step 722, session routing process 136 responds to the session reassignment request, which may arise as stations refer requests to other stations based upon, for example, appropriate capabilities determined from registration table 160. It is foreseeable that transfer between human-assisted stations 140 and automated stations 142 may occur fairly often. Dynamic transfer among stations may also be done for load balancing purposes. Session routing process 136 updates entry field 176 of the routing table entry 172 for the chat session with the new servicing station address, and passes the session ID of the chat session to the new servicing station. Based upon the session ID and the session state maintained within database 144 in association with the session ID, the new servicing station can seamlessly (i.e., without any indication to chat client 14 or the principal) deliver service within the chat session beginning from the most recent state.

For example, a principal could be involved in a chat session with a chatbot 140 and then require the assistance of a human operator. The principal or the chatbot 140 could request that the chat session be transferred to a human-assisted station 142. In response, session routing process 136 can transfer the session to the human-assisted station 142 (and possibly later transfer the chat session back to a chatbot 140) or join a human-assisted station 142 into the current chat session. After accomplishing the reassignment in step 722, the process terminates at step 730.

Referring now to step 724, if a control message received by session routing process 136 from a station 140, 142 is an end-of-session notification, process 700 moves to step 726. Step 726 illustrates session routing process 136 updating routing table 170 to remove routing table entries 172 corresponding to the terminated chat session. Thereafter, the process terminates at step 730.

If none of the conditions tested by steps 702, 706, 720 or 724 are true, then execution proceeds at step 718 to handle any other form of message that may be received. After any necessary processing is performed in step 718 then process 700 concludes at step 730.

Figure 8A:
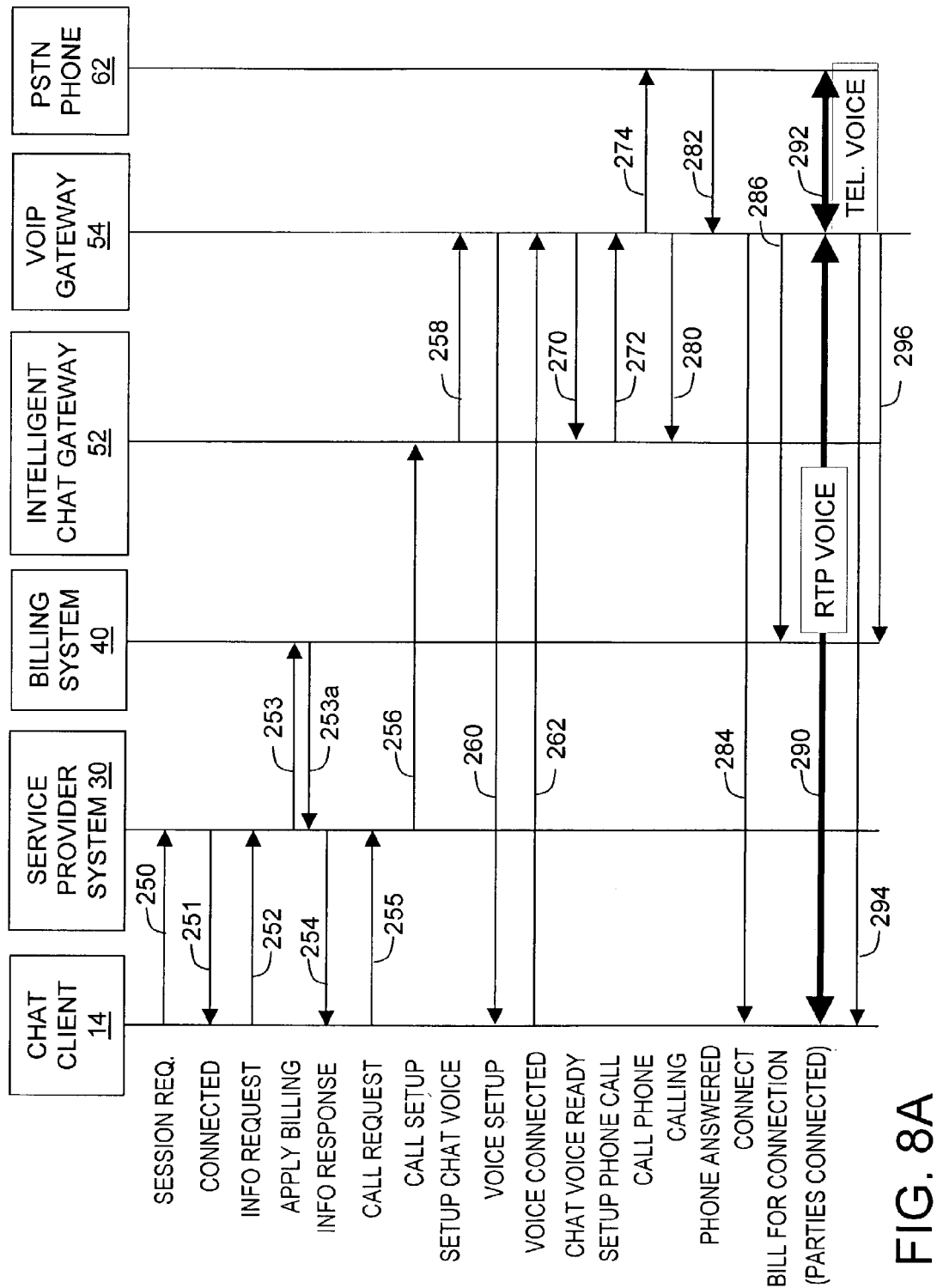
FIGS. 8A-8B are call flow diagrams of an exemplary sequence of communications by which a chat client accesses chat-based call completion services in accordance with the present invention.

With reference now to FIG. 8A, there is illustrated a message flow diagram of an exemplary communication flow by which a chat client accesses chat-based call completion services within communication system 10 of FIG. 1 in accordance with the present invention. It should be understood that many variations are possible in the way that elements of FIG. 1 might communicate to accomplish service functions in accordance with the present invention. As shown, chat client 14 initiates access to chat-based call completion services by transmitting a voice or text Chat Session Request 250, for example, in response to an associated human principal selecting the CSSN "Call Services" 124a and chat button 112 within messenger window 100 of FIG. 2. In response to receipt of Chat Session Request 250, service provider system 30 routes Chat Session Request 250 to a particular station 140, 142, which responds with a Chat Response 251 indicating that a chat session has been successfully established. For example, Chat Response 251 may be a voice or text chat message stating, "Welcome to Chat Call Services. How may I assist you?"

Chat client 14 may then follow with text or voice Chat Request 252, which may be a request for information, such as contact information for another party. A station 140, 142 may find the requested information and then return an answer 254 to the requesting chat client 14. Optionally, the fulfillment of the request may incur a charge to be billed to the requester or some other party. Accordingly, billing system 40 may be notified of the fulfillment of the request by message 253 which may carried along connection 42. In some implementations, billing system 40 may be consulted as part of a determination of whether a request should be fulfilled based upon the ability to obtain payment for fulfilling the request. This type of authorization role is represented by message 253a and may entail billing system 40 verifying whether a valid account exists and a balance is sufficient to accommodate the charges associated with fulfillment of requests. In response to message 253a, it is possible that service provider system 30 selectively performs further steps, such as responding via message 254, responsive to whether or not billing system 40 authorizes the providing of services. Those of ordinary skill will recognize that billing system 40 may be notified of usage or may be consulted for authorization at a number of junctures depicted in FIGS. 8A-8B. Billable usage may be assessed for various aspects of service fulfillment, as will be further described herein in conjunction with FIG. 9.

In FIG. 8A, the information provided in message 254 may satisfy the immediate needs of the requesting party or principal using chat client 14. The chat session with service provider system 30 may then be terminated expressly by either the principal or the service provider or may simply be terminated automatically after a period of inactivity, for example.

Alternatively, the principal using chat client 14 may desire to immediately initiate communications with a party for which the service provider has found contact information. Chat client 14 may send a call completion request 255 to service provider system 30 to request that a party be contacted via service provider system 30 and other components of system 10.

Upon receipt of a Call Completion Request 255, service provider system 30 may communicate instructions, via Call Setup Request 256, to intelligent chat gateway 52 to begin the process of setting up communications between the requesting principal and another party. Although not explicitly shown, the proceeding with call setup in this manner may be preceded by having billing system 40 verify that such call setup is permissible based upon, for example, applicable charges being billable to an account.

Call Setup Request 256 might contain, for example, a request to establish a connection with a specified terminating telephone number (e.g., 319-123-4567). Other information, such as a preferred mode of payment (e.g., credit card, calling card, collect, etc.), may also be included within the request or implied by the access mode. In order to provide the requested call completion service, the serving station 140, 142 within service provider system 30 sends a Call Setup Request 256 to intelligent chat gateway 52. Call Setup Request 256 may include the chat client type (AIM, Yahoo!® Messenger, MSN® Messenger, etc), the network (e.g., IP) address of chat client 14, the terminating telephone number, and optionally other capabilities of chat client 14.

In response to receipt of Call Setup Request 256, intelligent chat gateway 52 directs VoIP gateway 54 to establish communication with chat client 14 over network 20 and then establish communication with telephone 62 over PSTN 60. For example, to initiate communication between VoIP gateway 54 and chat client 14, intelligent chat gateway 52 transmits to VoIP gateway 54 a Call Setup Request 258 including at least the network address of chat client 14, and optionally, other information such as an indication of a data network signaling protocol for the call (e.g., Session Initiation Protocol (SIP), H.323, CCS7, etc.), a billing identifier or method, etc. In some embodiments, Call Setup Request 258 may provide all the information needed by VoIP gateway 54 to establish VoIP communication with chat client 14. In other embodiments, VoIP gateway 54 may obtain additional information regarding chat client 14 directly from the instant message server 22 providing instant messaging service to chat client 14, as shown in FIG. 1 at reference numeral 55.

VoIP gateway 54 responds to Call Setup Request 258 by transmitting a Call Setup message 260 to chat client 14 over network 20 utilizing a selected signaling protocol (e.g., SIP, H.323, or CCS7). Chat client 14 responds to Call Setup message 260 by transmitting an Acknowledgement message 262 indicating its availability for the call. VoIP gateway 54 then informs intelligent chat gateway 52 of successful call setup with chat client 14 by sending Call Chat Done message 270. In response to successful call setup with chat client 14, intelligent chat gateway 52 then directs VoIP gateway 54 by Call Terminating Phone message 272 to perform call setup for telephone 62 over PSTN 60.

In response to receipt of Call Terminating Phone message 272, VoIP gateway 54 sends Call Setup Request 274 to telephone 62 over PSTN 60, for example. Utilizing Integrated Services Digital Network (ISDN), SS7, feature group D (FGD) or other telephony signaling protocol along a signaling connection 58, a bearer connection 59 is established involving PSTN 60 and connecting ultimately to telephone 62. VoIP gateway 54 notifies intelligent chat gateway 52 of call setup request 274 with Call Terminating Phone Done message 280. Call Setup Request 274 effects ringing of telephone 62. When telephone 62 is answered, for example, by a human or automated attendant taking telephone 62 off-hook, VoIP gateway 54 detects the telephone 62 going off-hook, as indicated at reference numeral 282, and connects telephone 62 with chat client 14 to complete the call, as indicated at reference numeral 284. Optionally, where charges are incurred for the call, a message 286 may be sent to billing system 40, such as along connection 41, to establish a starting time for the billable call and begin the accumulation of charges based on call duration. For the duration of the call, telephone 62 sends and receives voice communication 292 to and from VoIP gateway 54 over PSTN 60, and chat client 14 sends and receives a real time protocol (RTP) IP voice stream 290 to and from VoIP gateway 54 over network 20 independently of intelligent chat gateway 52 and service provider system 30. Alternatively, the communications established could be voice-enabled chat (e.g. sound bites) or could involve translation through intelligent media translator 70. Upon VoIP gateway 54 detecting termination of the call leg with telephone 62, VoIP gateway 54 notifies chat client 14 that the call is over with Done message 294. VoIP gateway 54 may also send message 296 to billing system 40 to signify that the call has ended and that accumulation of charges may cease.

Figure 8B:
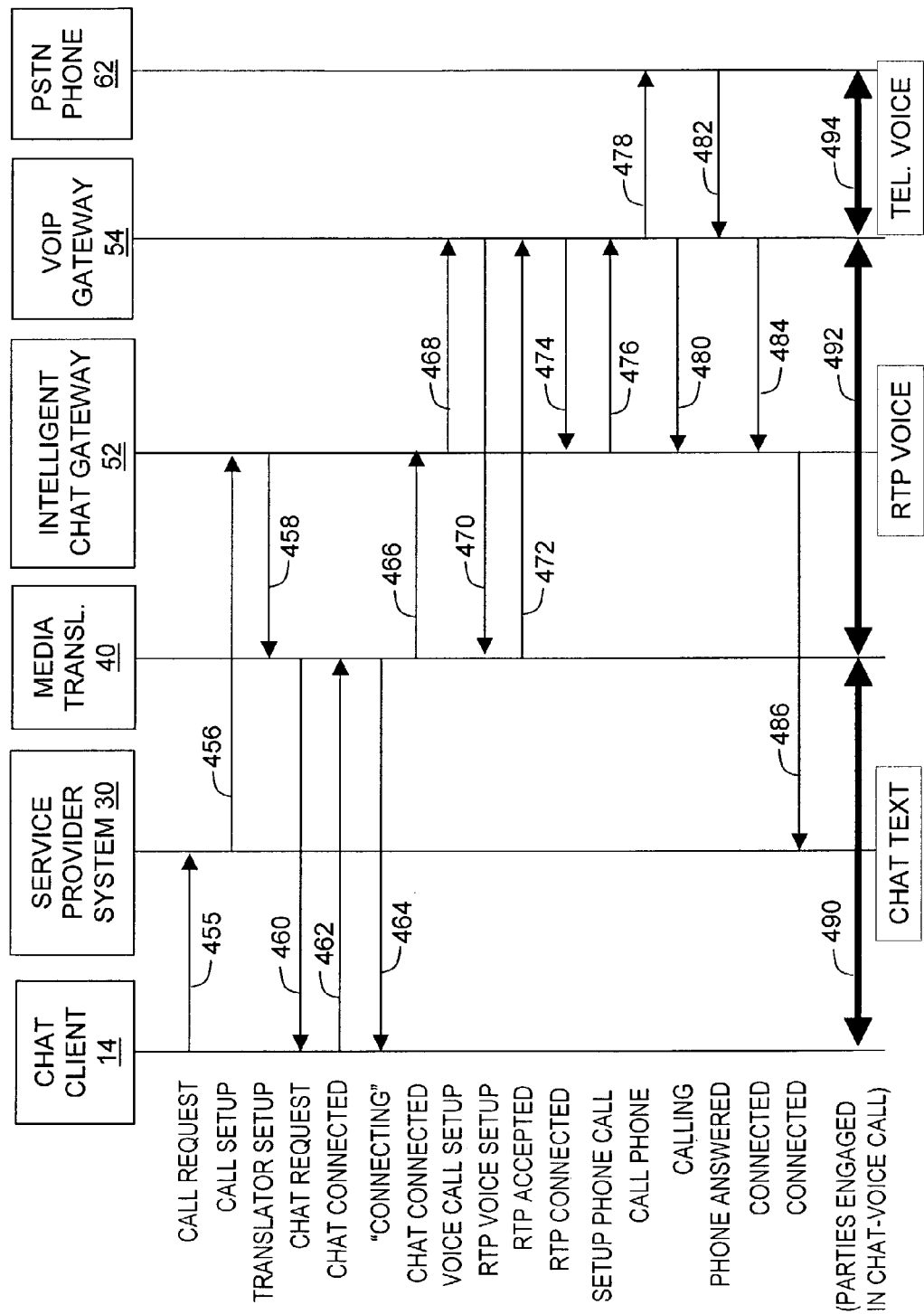

With reference now to FIG. 8B, a process is depicted by which call completion requested by a principal may result in a "chat-to-telephone" connection by involving intelligent media translator 70. Many of the same steps shown in FIG. 8A, such as the initial request for contact information and the messaging to billing system 40, are applicable to this scenario but are omitted for the sake of clarity.

Call request 455 from chat client 14 is comparable to call request 255 as was shown and described in FIG. 8A. Upon receiving such request, and perhaps checking billing status for the party making the request, a call setup request 456 is sent to intelligent chat gateway 52 to begin the process of making three connections, namely:

a. a text chat session between intelligent media translator 70 and chat client 14, b. an RTP or comparable voice connection between gateway 54 and intelligent media translator 70, c. a voice connection through telephone network 60 between gateway 54 and phone 62.

As one way of accomplishing these connections, gateway 52 might then send a translator setup message 458 to intelligent media translator 70 instructing the latter to allocate processing resources (modules 72, 74) to be assigned to the new connection. Translator setup message 458 may convey information, such as network address or screen name for chat client 14, so that intelligent media translator 70 may then establish a chat session with chat client 14. The ensuing chat messaging, presented by connections 76, 77 may actually be carried within network 20 and may be partly or fully conducted through IM service 22. To initiate communications, intelligent media translator 70 may send one or more initial messages 460 to chat client 14. Chat client 14 may respond with message(s) 462 whereupon intelligent media translator 70 and chat client 14 are in successful communication. Optionally, intelligent media translator 70 may acknowledge with a call progress message 464 of sorts saying something like "Connecting . . . Please wait." Meanwhile, intelligent media translator 70 reports back to intelligent chat gateway 52, via message 466, that the translator-to-chat client connection has been successfully made.

Next, intelligent chat gateway 52 may instruct VoIP gateway 54 to initiate a packet voice connection, such as a two-way RTP connection, with intelligent media translator 70. Messages 470, 472 represent the formation of an RTP connections 75, 78. Intelligent media translator 70 may have to provide an address and/or port number, perhaps carried through messages 466 and 468, so that the resulting RTP connection is properly matched to the instances of modules 72, 74 that are prepared to handle translations involving the particular chat client 14. Alternatively, both intelligent media translator 70 and gateway 54 may negotiate using some sort of session ID passed in the various messages to ensure proper mapping of voice and chat connections. Once the RTP connection between intelligent media translator 70 and gateway 54 is successfully established, gateway 54 reports the status of the connection to intelligent chat gateway 52 using message 474. Intelligent chat gateway 52 may then instruct VoIP gateway 54, via message 476, to originate a telephone call. Message 478, which accomplishes the calling of phone 62, may represent telephony signaling such as ISDN, SS7, C7, Feature Group D or other measures to originate a phone call to reach phone 62, most likely through an intervening network such as the PSTN.

Message 480 represents an acknowledgement that the call is being placed to phone 62 as requested. When phone 62 is answered by a party, a message 482 is received from the telephone network indicating that the called party has gone "off-hook" and is now connectable. Messages 484 and 486 indicate that this occurrence may be reported back to the service provider system 30 to perhaps provide feedback, serve billing purposes, or allow a service provider agent to interact with the called party or the requestor in some fashion. ICG 52 or service provider system 30 may even signal intelligent media translator 70 to send out a chat prompt to chat client 14 and an audio message to phone 62 so that the parties become aware that they are connected and that the connection is a chat-voice translated connection. Without some notification of this type, the communicating parties may be confused about what is happening and may even abandon the call without communicating.

Corresponding to the three connections described above, chat traffic 490, RTP traffic 492 and telephone voice traffic 494 are then carried through their respective networks as the parties communicate.

As described before, the communications among chat client 14 and phone 62 may continue until one or both parties terminate the call. It is also conceivable that, at any time, one of the parties may "roll over" the call to a more convenient form of communication, such as voice-enabled chat.

While a particular sequence of messages have been depicted in FIGS. 8A and 8B by way of example, it should be acknowledged that there are many ways to coordinate the formation of the required connections between a principal using chat client 14 and a party using phone 62.

More generally, in performing any of the functions described herein, there are a number of variations possible in terms of which elements initiate connections or control other elements to carry out the needed functions. It is contemplated that, in an alternative embodiment, other entities, such as service provider system, may dispatch commands to various elements, such as intelligent media translator 70, to coordinate the formation of such connections. For example, intelligent media translator 70 might receive instructions from either service provider system 30 or intelligent chat gateway 52 and then autonomously coordinate the forming of chat connections 76, 77 and RTP connections 75, 78 and then signaling directly to VoIP gateway 54 to accomplish a telephone call through PSTN 60. Intelligent media translator 70 may comprise a controller 73 to communicate with and receive and process instructions from either or both of service provider system 30 or intelligent chat gateway 52 along connections 80 through network 20.

Controller 73 may, for example, coordinate the allocation of communication ports and processing resources within intelligent media translator 70 in response to instructions from other elements.

It is also possible that intelligent media translator 70, via controller 73, might control other elements to coordinate connections. Intelligent media translator 70 may instruct intelligent chat gateway 52 to cause VoIP gateway 54 to form an RTP connection addressed to a particular port on intelligent media translator 70. Connections 80 may also represent merely the passage of information, rather than actual commands, useful for coordinating communications, such as the passage of network address information or screen names.

Under various call scenarios, call coordination could conceivably begin with almost any element and be carried out in almost any sequence. The sequencing of connection formation and sequencing, format and content of messages may vary and yet accomplish the same end result. There are also many ways to convey addresses and other identifiers among elements to ensure accurate connections. The present invention is not intended to be limited by only the particular call flows which are presented here by way of example.

These possibilities give rise to novel and useful elements such as a intelligent media translator having a chat interface and having call setup signaling capabilities. Another novel element in accordance with an embodiment of the present invention is system comprising an VoIP gateway which can originate connections in both telephone and packet network domains.

It should be noted that even newer style telephones and telephone systems made to interface directly with a packet network, like the so-called "IP phones" represented by IP phone 92 in FIG. 1. IP phone 92 represents a type of internet-protocol telephony client and could also be implemented as an application running on a computer. Despite chat client 14 and IP phone 92 both being digital data devices coupled through a data network, users of these devices may still benefit from features of the present invention. A person using IP phone 92 may find it advantageous at times to engage in translated voice-to-chat communications or voice-enabled chat with a chat client 14. Whereas VoIP gateway 54 is obviated in this scenario, many of the elements interact in much the same way to establish RTP connection with IP phone 92 as will be recognized by those of ordinary skill in the relevant art.

Billing

As described above with reference to FIG. 1, service provider system 30, gateway 50, IM service (IMS) 22 are shown to be coupled to one or more billing systems 40 (illustrated collectively in FIG. 1 for simplicity) in order to bill chat clients 14 for access to at least some chat-based services. The depicted connections 41, 42, 43, coupling gateway 50, SPS 30 and IMS 22 respectively, represent an approach of providing a billing system interface through which indications of billable activity may be sent to the billing system and authorization to perform requested services may be obtained from the billing system. In some implementations, IMS 22 may represent a private or semi-private messaging system operated to provide a source of revenue or cost recovery. Any of the elements in FIG. 1 may be directly coupled to billing system 40 to engage billing related function or may be indirectly coupled through other elements. Those of ordinary skill in the art will appreciate that billing functions may also be integrated into, or distributed among, elements of system 10 to varying degrees.

In the preceding description of at least FIGS. 1 and 8A, billing system 40 was shown to participate in collecting information indicative of usage activity in communications system 10 and in authorizing activity based on whether such activity could be paid for in some manner. As exemplified in FIG. 8 at reference numeral 286, service provider system 30 may provide indication of call completion services to billing system 40 in response to successful call completion (as shown) or in response to initiating call setup by sending Call Setup Request 256. Alternatively or additionally, as shown at reference numeral 296, VoIP gateway 54 may give indication to billing system 40, on behalf of service provider system 30, that call completion services have been invoked. VoIP gateway 54 may also notify billing system 40 of its own role in carrying the call, perhaps reporting call duration upon completion of the call. As system 10 may interact with and provide services in conjunction with a telephone network, such as PSTN 60, it should be understood that billing system 40 may also interact with telephone network equipment in pursuit of performing billing functions. For example, telephone network equipment, such as switches or service control points (SCPs) may provide indications of usage upon which billing system 40 may base calculation of usage charges.

It should be noted that various elements in FIG. 1 may report a variety of indications to billing system 40 indicating usage of the system which may be billable. The billing system may note these occurrences and determine charges associated with the usage. Furthermore, as depicted in FIG. 8A and elsewhere, billing system 40 may also participate in authorization or metering of activity in the system based upon whether a valid account exists to which charges may be applied.

Various elements that provide usage indications need not all be coupled directly to billing system 40. Some elements may pass along usage information for other elements. Some elements may append usage information to other inter-element communications such as the messages shown in FIGS. 8A-8B. For example, in FIG. 1 usage of translation facilities in IMT 70 may be reported to billing system 40 by way of communications between IMT 70 and ICG 52. ICG 52 may receive usage indications from IMT 70 and append additional information pertaining to usage of gateway 50 before sending the information along to billing system 40. Thus, elements may combine some types of information to, for example, provide billing system 40 a comprehensive view of a given session. As those of skill in the art will appreciate, the same types of usage indications reported to billing system 40 may also be useful for collecting statistics to facilitate traffic engineering and fraud detection.

Some types of activity or events in the system which are reported to billing system 40 may relate to invocation of certain actions or features for which charges may be applicable. For example, a party using chat client 14 might be charged for each time they contact service provider system 30 or for each time they use the system to retrieve information, to perform an action or to establish communications with a called party. A calling party might also incur fees for having the system map a first identifier, such as a name or an alias, to a second identifier, such as telephone number. The resulting usage charges may be applied to the originating party, the called party or even a third party. An originating party using a chat client 14 may have charges billed to their own telephony-related account even though, via the chat-accessible services offered, they may be engaging in non-telephony activity. The combination of IM service and screen name used by an originating party may be automatically mapped to a billable telephony account by SPS 30, perhaps by using subscriber database 330 (described below) or the like.

A communicating party might be charged differently for invocation of textual messaging versus voice communications. A party may be charged a fee each time a translator is engaged to enable telephony-to-instant-communications call completion. A calling party may even be charged for requesting information about the balance on an account.

Other types of activity in the system may relate to quantifying usage of system resources. For example, charges may be applied based upon a time duration of a communications session, a volume of data or traffic handled by the system, or a quantity of translation performed. It is possible that elements such as VoIP gateway 54 or IMT 70 may count a number of packets processed, a number of symbols converted, or monitor elapsed time for a given session and then report this information to billing system 40.

A third possibility for billable activity in the system relates to options, features and subscribed services. Options or features may relate to, for example, class of service provided by the system or to customizability. In particular, parties using the system might pay extra to control the translator function in ways such as selecting languages to be used during translation, providing support for 'emoticons' or selecting voice characteristics to properly represent the gender or other characteristics of the party who is using textual messaging. Another option that might be billable is automatic notification of balance or charges as a party uses the system. In this third category, it is likely that the billing system mostly serves to authorize activity based upon options selected by the user and/or the status of an account that is to pay for the options.

A novel situation is created in the context of some embodiments of the present invention wherein traffic from multiple different IM services converges in a single platform. At least in FIG. 3, it is evident that parties may contact service provider system 30 from a variety of instant messaging services 130 and the each party is identified to the system, at least initially, by an instant messaging screen name. For billing and perhaps other purposes, it may be desirable to establish an account that is identified at least partially based upon one's screen name.

A problem arises in that, although screen names are unique within each IM service, there is the likelihood that many screen names assigned to users in a first IM service are identical to screen names assigned to a different users in a second IM service. There is no assurance of screen name uniqueness across all IM services.

In order to enable screen-name-associated accounts, some embodiments of the present invention provide for a novel type of billable account that is resolved by a combination of IM service identifier and screen name. Both identification of an IM service and a particular user, such as by screen name, within that service provide sufficient uniqueness to correctly specify a party from among all parties who may access the system. Combination of these identifiers may also be useful in maintaining and accessing profile information and other data associated with a user account.

Figure 9:
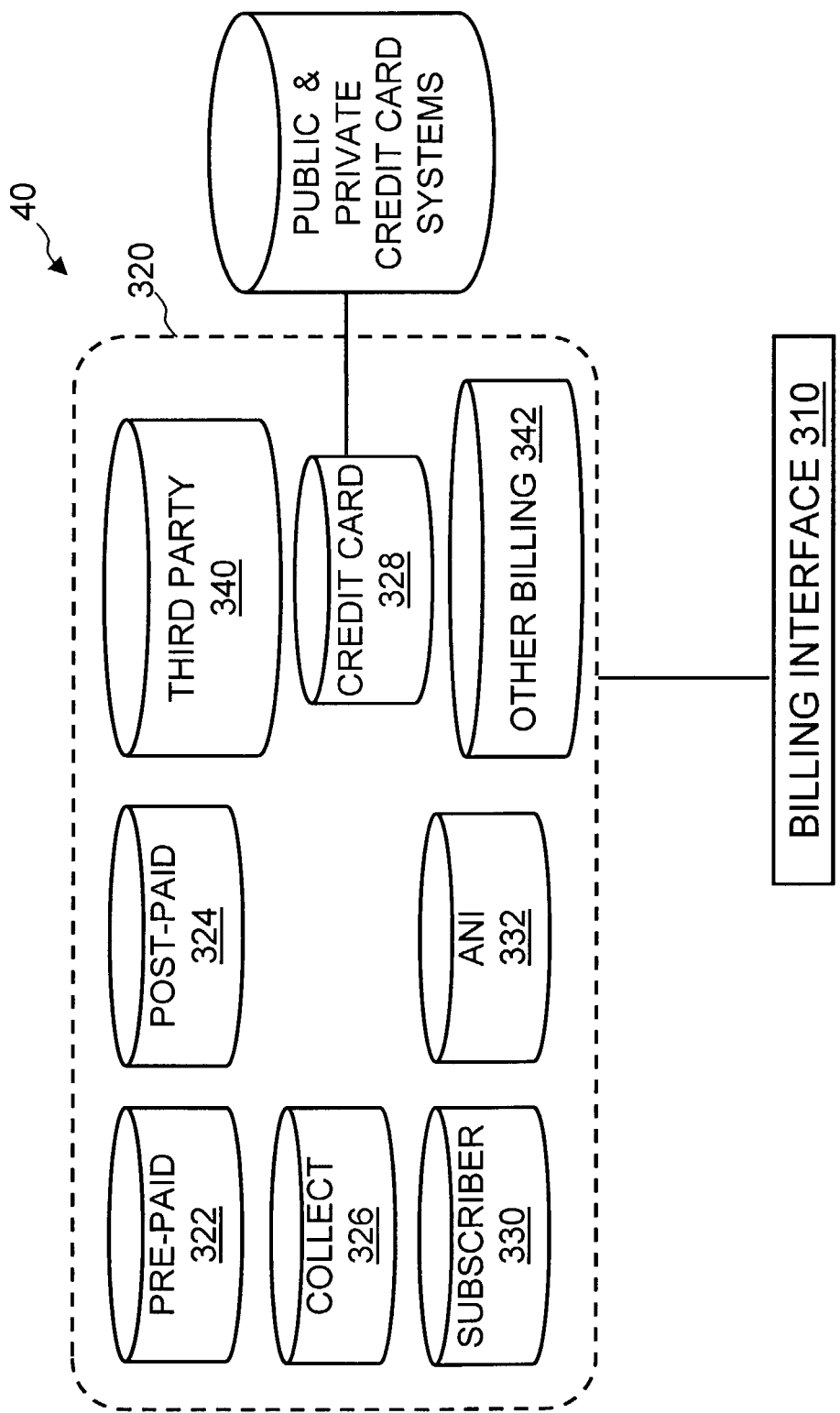
FIG. 9 is a high-level step diagram of an exemplary embodiment of a billing system in accordance with the present invention.

Referring now to FIG. 9, there is illustrated a high-level step diagram of an exemplary embodiment of billing system 40 in accordance with the present invention. In the depicted embodiment, billing system 40 comprises a billing database 320 and a billing interface 310 that creates billing records within billing database 320 in response to billing requests received from service provider system 30 or gateway system 50. Billing system 40 may be implemented, for example, as one or more server computer systems executing billing interface 310 in software.

Billing database 320 comprises a number of individual databases that each represent a particular method of billing. Each individual database may be implemented by an actual database containing records of accounts or may comprise an interface to an external system, such as a validation system operated by a credit card company. Examples of databases that may exist in billing database 320 are summarized below in Table I.

TABLE I

| Database | Description |
| --- | --- |
| Pre-paid database 322 | User purchases services prior to use and billing system deducts value of services from pre-paid balance |
| Post-paid database 324 | User pays for services after use |
| Collect database 326 | Bills chat-based services to called party's telephony services account |
| Credit card database 328 | Bills chat-based services against user's credit card account |
| Subscriber database 330 | Bills chat-based services to user's chat-based services account |
| ANI database 332 | Bills chat-based services to user's associated telephony services account |
| Third Party 340 | Bills chat-based services to user's account with third party, such as another service provider or commercial entity |

As indicated by Other billing database 342 shown in FIG. 9, the above billing methodologies are not exclusive, but are instead merely illustrative of some of the billing options that may be implemented to receive value in exchange for the provision of chat-based services.

Implementations of billing functionality within the system of FIG. 1 may be logically or physically centralized or distributed or may be integrated to varying degrees into other elements or functions that have been described thus far. The manner in which billing functionality may be implemented and coupled with other elements or integrated with other functions will be further clarified in the following discussion pertaining to FIG. 10.

Hardware Overview

As will be readily apparent to persons of ordinary skill in the relevant art, any of the functional elements, systems and processes depicted in FIGS. 1 through 10 may be implemented in various ways using, for example, suitably equipped data processing systems or computing environments. Such implementations may comprise hardware, firmware, software, or combinations thereof, to accomplish intended functions in accordance with the teachings of the present invention. For example, any or all of service provider system 30, session router 32, intelligent media translator 70 and intelligent chat gateway 52, or functional subsystems depicted therein, may be implemented as processes in a program-controlled computing environment. Processes depicted in FIGS. 7A through 8B may be implemented wholly or partially as processing threads occurring within a computer processor under software and/or firmware control. A given process may be implemented in a distributed fashion among multiple physical processors or multiple logical processing threads. A single processor may participate in implementing multiple instances or multiple types of the processes shown. Any of the functions shown, or the hardware used to implement these functions, may be distributed among remote locations or may be collocated.

It will also be appreciated that connectivity among elements for carrying control signals, telephony-style signaling, SIP signaling, instant communications session establishment, billing-related information, bearer channel signals and messaging traffic and the like, may be accomplished via communications through a network, a shared bus, shared memory resources or by inter-process communications or even combinations or pluralities of these.

Even signals representing telephone audio signals may be conveyed to processing equipment in the form of data through a bus or network. Methods and devices for converting among analog audio signals and digital data are well known and are not explicitly shown in FIG. 1 or FIG. 10, although it is common that PSTN 60 or gateway 54 are equipped to perform these conversions. Adaptation to external systems, such as a telephone network represented by PSTN 60, may be accomplished by the use of well-known computer-telephony adapter cards (as those made by Dialogic Communications Corporation), commercially available automatic call distributors (ACDs) and Private Branch Exchange (PBX) equipment.

An exemplary arrangement of computing hardware suitable for implementing functional elements and processes in accordance with the present invention will now be described in conjunction with FIG. 10, although it should be understood that aspects of the present invention may be embodied in other ways.

Figure 10:
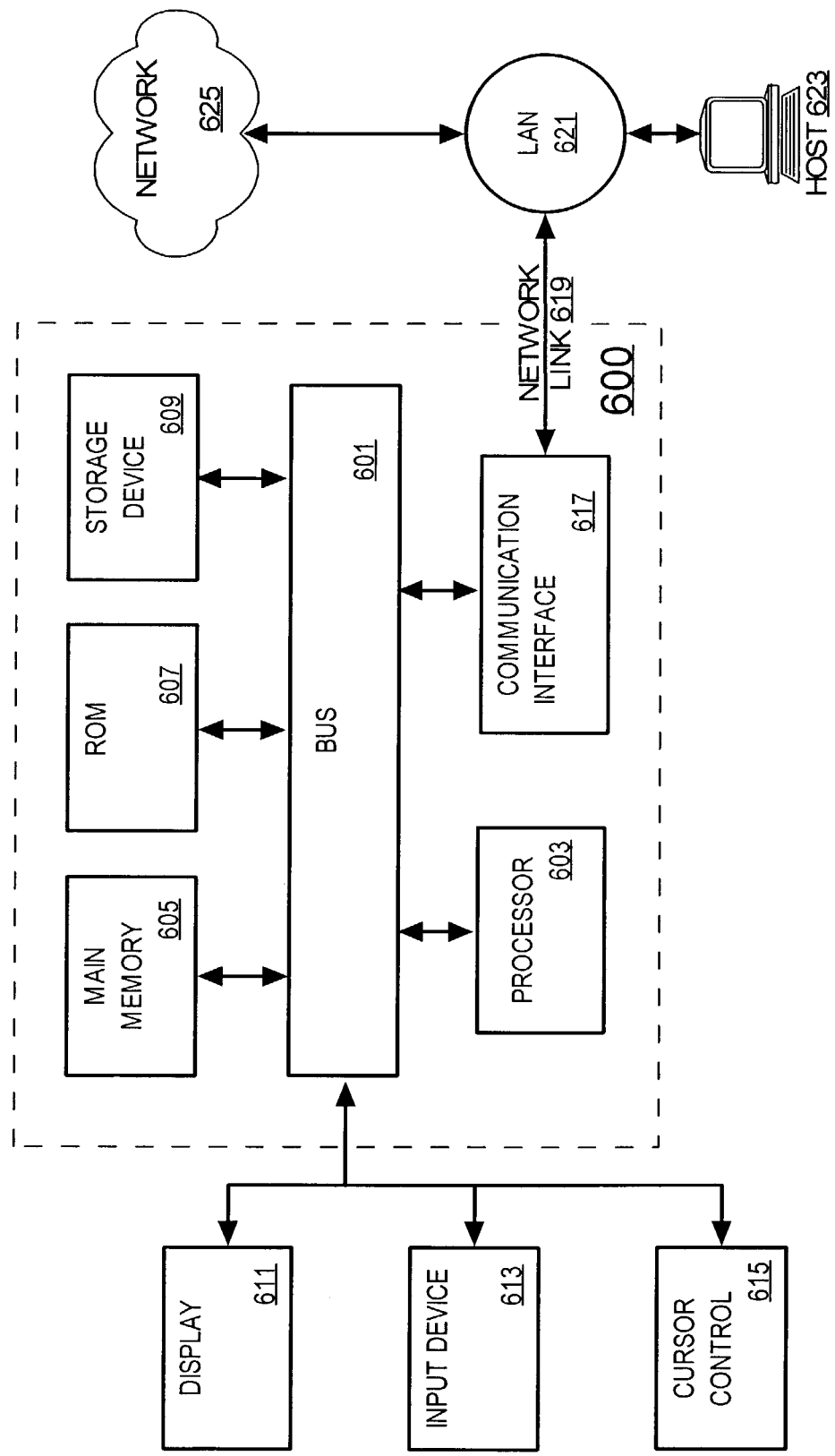
FIG. 10 depicts a computer system that can be used to implement an embodiment of the present invention or to implement various elements thereof.

FIG. 10 illustrates a computer system 600 upon which an embodiment according to the present invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, call processing is provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 10, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 605 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire, and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

For example, although aspects of the present invention have been described with respect to computer systems executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

As has been described, the present invention provides methods, systems and program products by which a service provider system can make one or more service offerings available via chat, or other instant communications, and by which a principal associated with a chat client may access these chat-based services. In at least some embodiments of the present invention, the service provider system includes multiple stations that provide one or more chat-based services under a common CSSN and a session router that distributes chat sessions to the stations for service. The chat-based services may be offered without charge or may be subject to a per-use or per-unit fee that is billed by a billing system coupled to the service provider system. In embodiments of the present invention in which the chat-based service offerings include call completion, the service provider system may be coupled to a gateway system that facilitates voice communication between a chat client and a destination station within a telephony network.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. In a communications system, a method for managing messaging communications among a plurality of parties and a messaging response system comprising a plurality of messaging stations, the method comprising the steps of:

receiving first messaging communications in text format at the messaging response system;

identifying a first party as having originated first messaging communications;
selectively routing the first messaging communications to a particular first messaging station based at least upon an identity of the first party;
translating and converting the first messaging communications from a written language into a different spoken language to generate a corresponding first audio messaging communications in audio format to be transmitted to a second party based on language preferences stored in a first profile of the first party;
receiving a second audio messaging communications in audio format from the second party in replying to the first audio messaging communications at the messaging response system;
translating and converting the second audio messaging communications from the spoken language into the written language to generate a corresponding second messaging communications in text format to be transmitted to the first party based on language preferences stored in a second profile of the second party; and
charging accounts of the first and the second parties fees for the translation and conversion services.

2. The method of claim 1 further comprising:
identifying a messaging service through which the first messaging communications are received; and
selectively routing the first messaging communications to the first messaging station further based at least upon an identity of the messaging service.

3. The method of claim 2 further comprising:
maintaining a first routing association involving the identity of the first party and the messaging station, wherein the routing association represents that messaging communications from the first party are to be routed to the first messaging station.

4. The method of claim 3 wherein the first routing association acts by associating the first messaging station with a first party identifier from a group including: a screen name by which the first party is known in an instant messaging system, a network address for the instant communications client used by the first party, an account name, an account number, and a user name by which the first party is known to the messaging response system.

5. The method of claim 1 further comprising:
establishing a first routing association between the first party and a first messaging station, wherein the establishing of the first routing association is performed upon the receiving of the first messaging communications from the first party by the messaging response system.

6. The method of claim 5 wherein the first routing association indicates the first messaging station being associated with a first party identifier from a group including: a screen name by which the first party is known in an instant messaging system, a network address for the instant communications client used by the first party, an account name, an account number, a user name by which the first party is known to the messaging response system.

7. The method of claim 5 further comprising the step of:
selecting the first messaging station to be associated with the first party responsive to at least one of: availability of the first messaging station, activity level of the first messaging station, suitability of the first messaging station to communicate with the first party, resources available to the first messaging station, capabilities of the first messaging station, prearranged association of the first messaging station with the first party, and an attribute of the first party meeting criteria to be handled by the first messaging station.

8. The method of claim 1 wherein the first party addresses the first messaging communications to the messaging response system using a first identifier associated with the messaging response system.

9. The method of claim 8 further comprising:
receiving second messaging communications from the first party addressed to a second identifier;
determining whether the first identifier and second identifier are commonly associated with the messaging response system; and
providing the first identifier to the first party responsive to whether the first identifier and second identifier are commonly associated with the messaging response system.

10. The method of claim 9 wherein the selectively routing the first messaging communications to a particular first messaging station is responsive to at least one of the first identifier and the second identifier.

11. The method of claim 8 wherein the first identifier is a screen name used as an identifier in an instant messaging service.

12. The method of claim 8 further comprising the step of:
routing a second messaging communications from the first messaging station to the first party, wherein a sender identifier associated with the second messaging communications and indicated to the first party as the source of the second messaging communications is the same as the first identifier associated with the messaging response system.

13. The method of claim 8 further comprising the steps of:
receiving, at the messaging response system, second messaging communications from the second party;
establishing a second routing association between the second party and a second messaging station; and
responsive to the second routing association, routing the second messaging communications from the second party to the second messaging station.

14. The method of claim 13 wherein the messaging communications from the first party is received at the messaging response system from a first messaging service and messaging communications from the first station in response to the first party are forwarded to the first messaging service for sending to the first party.

15. The method of claim 14 wherein the messaging communications from the second party is received at the messaging response system from a second messaging service coupled to the service provider system and messaging communications from the second station in response to the second party are forwarded to the second messaging service for sending to the second party.

16. The method of claim 13 wherein the second party addresses the second messaging communications to the messaging response system using the first identifier associated with the messaging response system.

17. The method of claim 16 wherein messaging communications received by the second party from the second messaging station system sender name is the same as the first identifier associated with the messaging response system.

18. The method of claim 8 wherein the selectively routing the first messaging communications to a particular first messaging station is responsive at least to the first identifier.

19. The method of claim 18 wherein the first identifier is a screen name used as an identifier in an instant messaging service.

20. The method of claim 18 further comprising:
maintaining a first routing association involving the identity of the first party and the first identifier and the first messaging station, wherein the routing association represents that messaging communications from the first party addressed to the first identifier are to be routed to the first messaging station.

21. The method of claim 20 further comprising:
receiving second messaging communications from the first party addressed to a second identifier associated with the message response system; and
selectively routing the second messaging communications to a second messaging station.

22. The method of claim 1 wherein the messaging response system includes a human-operated messaging station and an automatic messaging station for automatically handling messaging communications.

23. The method of claim 1 further comprising the step of:
eliminating the first routing association wherein subsequent messaging communications from the first party are prevented from being sent to the first messaging station.

24. The method of claim 23 wherein said eliminating the first routing association is responsive to instructions from at least one of: the first party, the first messaging station, a second messaging station, the messaging response system, a third messaging station of the messaging response system and a third party associated with the messaging response system.

25. The method of claim 1 further comprising the step of:
establishing a second routing association associating the first party with a second messaging station, wherein messaging communications from the first party are sent to the second messaging station.

26. The method of claim 25 wherein said establishing the second routing association is responsive to instructions from at least one of: the first party, the first messaging station, the second messaging station, the messaging response system, a third messaging station of the messaging response system and a third party associated with the messaging response system.

27. The method of claim 25 further comprising the step of:
eliminating the first routing association wherein subsequent messaging communications from the first party are prevented from being sent to the first messaging station.

28. The method of claim 27 wherein the eliminating the first routing association is responsive to instructions from at least one of: the first party, the first messaging station, the second messaging station, the messaging response system, a third messaging station of the messaging response system and a third party associated with the messaging response system.

29. The method of claim 1 further comprising the step of:
changing the first routing association to associate the first party with a second messaging station, wherein subsequent messaging communications from the first party are prevented from being sent to the first messaging station and are instead sent to the second messaging station.

30. The method of claim 29 wherein said changing the first routing association is responsive to instructions from one of the first party, the first messaging station, the second messaging station and the messaging response system.

31. The method of claim 1 further comprising:
in relation to a communications session involving messaging communications between the first party and the messaging response system, storing session information including at least one of: an identifier associated with the first party, state information related to the communications session with the first party, degree of progress through a programmatic sequence of steps performed by the messaging response system, copies of at least portions of messaging communications, information obtained from the party, information requested by the party, information pertaining to the party, information obtained from a database responsive to communications with the party, information pertaining to the first messaging station, and pointers, links, handles, indices and other references to places where additional data can be obtained.

32. The method of claim 31 further comprising the steps of:
associating a second messaging station with the first party, wherein messaging communications from the first party are sent to the second messaging station; and
accessing, by the second messaging station, session information stored by the first messaging station.

33. The method of claim 1 further comprising the steps of:
associating a second messaging station with the first party, wherein messaging communications from the first party are sent to the second messaging station; and
conveying, from the first messaging station to the second messaging station, session information pertaining to a communications session involving messaging communications between the first party and the messaging response system, the session information including at least one of: an identifier associated with the first party, state information related to the communications session with the first party, degree of progress through a programmatic sequence of steps performed by the messaging response system, copies of at least portions of messaging communications, information obtained from the party, information requested by the party, information pertaining to the party, information obtained from a database responsive to communications with the party, information pertaining to the first messaging station, and a reference to a place where data can be obtained.

34. The method of claim 1 further comprising the step of:
indicating, to the billing system, activity pertaining to the selectively routing of the first messaging communications to the first messaging station.

35. The method of claim 1 further comprising the step of:
providing to a billing function at least one of: an identifier associated with the first party, an identifier associated with an instant communications client used by the first party, an identity of an instant messaging service by which the first party communicates with the messaging response system and an identifier by which the first party addresses communications to the messaging response system.

36. A session router for routing messaging communications among a plurality of parties and a first messaging response system comprising a plurality of messaging stations, the session router comprising:
a messaging service interface for communicating a first messaging communications in text format among a first party and the first messaging response system;
a routing associating means for providing a first routing association between the first messaging communications associated with the first party and a first messaging station;
a session routing process for causing the first messaging communications from the first party to be selectively communicated to the first messaging station responsive to the routing association represented by the routing associating means;

a translator and converter means for translating and converting the first messaging communications from a written language into a different spoken language to generate a corresponding first audio messaging communications in audio format to be transmitted to a second party based on language preferences stored in a first profile of the first party;

a means for receiving a second audio messaging communications in audio format from the second party in replying to the first audio messaging communications at the first messaging response system, wherein the translator and converter means translates and converts the second audio messaging communications from the spoken language into the written language to generate a corresponding second messaging communications in text format to be transmitted to the first party based on language preferences stored in a second profile of the second party; and a billing system charging accounts of the first and the second parties fees for the translation and conversion services.

37. The session router of claim 36 wherein the routing association means acts to associate the first messaging station with a first party identifier from a group including: a screen name by which the first party is known in an instant messaging system, a network address for the instant communications client used by the first party, an account name for the first party, an account number for the first party, and a user name by which the first party is known to the first messaging response system.

38. The session router of claim 36 wherein the session router acts to establish the first routing association between the first party and the first messaging station upon the receiving of the first messaging communications from the first party by the first messaging response system.

39. The session router of claim 38 wherein the routing association means acts to associate the first messaging station with a first party identifier from a group including: a screen name by which the first party is known in the instant messaging system, a network address for an instant communications client used by the first party, an account name, an account number, a user name by which the first party is known to the first messaging response system.

40. The session router of claim 38 wherein the session router acts to select the first messaging station to be associated with the first party responsive to at least one of: availability of the first messaging station to communicate with the first party, activity level of the first messaging station, suitability of the first messaging station to communicate with the first party, resources available to the first messaging station, capabilities of the first messaging station, prearranged association of the first messaging station with the first party, and an attribute of the first party meeting criteria for being handled by the first messaging station.

41. The session router of claim 38 wherein the session router acts to receive availability information pertaining to the first messaging station and to select the first messaging station to be associated with the first party responsive to at least the availability information of the first messaging station.

42. The session router of claim 36 wherein the session router acts to receive messaging communications from the first party wherein the first party addresses the messaging communications to the first messaging response system using a first identifier associated with the first messaging response system.

43. The session router of claim 42 wherein the first identifier is a screen name used as an identifier in an instant messaging service.

44. The session router of claim 42 wherein the router acts to route a second messaging communications from the first messaging station to the first party, wherein a sender identifier associated with the second messaging communications and indicated to the first party as the source of the second messaging communications is the same as the first identifier associated with the first messaging response system.

45. The session router of claim 42 wherein the session router is operable to:
receive, at the first messaging response system, second messaging communications from the second party;
establish a second routing association between the second party and a second messaging station; and,
responsive to the second routing association, route the second messaging communications from the second party to the second messaging station.

46. The session router of claim 45 wherein the session router acts to receive messaging communications from the first party wherein the second party addresses the second messaging communications to the first messaging response system using the first identifier associated with the first messaging response system.

47. The session router of claim 46 wherein the session router acts to send third messaging communications to the second party from the second messaging station system wherein a sender identifier for the third messaging communications is the same as the first identifier associated with the first messaging response system.

48. The session router of claim 45 further comprising:
a first messaging system gateway means for communicating with a first messaging service, wherein the messaging communications from the first party is received via the first messaging service and messaging communications from the first station in response to the first party are forwarded to the first messaging service for sending to the first party.

49. The session router of claim 45 further comprising:
A second messaging system gateway means for communicating with a second messaging service, wherein the messaging communications from the second party is received at the first messaging response system from a second messaging service coupled to the service provider system and messaging communications from the second station in response to the second party are forwarded to the second messaging service for sending to the second party.

50. The session router of claim 36 wherein the session router acts to interface to a human-operated messaging station and to an automatic messaging station for automatically handling messaging communications.

51. The session router of claim 36 wherein the routing associating means acts to eliminate the first routing association wherein subsequent messaging communications from the first party are prevented from being sent to the first messaging station.

52. The session router of claim 51 wherein the routing association means acts to eliminate the first routing association responsive to instructions from at least one of: the first party, the first messaging station, a second messaging station, the first messaging response system, a third messaging station of the first messaging response system and a third party associated with the first messaging response system.

53. The session router of claim 36 wherein the routing association means acts to establish a second routing association associating the first party with a second messaging station, wherein messaging communications from the first party are sent to the second messaging station.

54. The session router of claim 53 wherein the routing association means acts to establish a second routing association associating the first party with a second messaging station responsive to instructions from at least one of: the first party, the first messaging station, the second messaging station, the first messaging response system, a third messaging station of the first messaging response system and a third party associated with the first messaging response system.

55. The session router of claim 53 wherein the routing association means acts to eliminate the first routing association wherein subsequent messaging communications from the first party are prevented from being sent to the first messaging station.

56. The session router of claim 55 wherein the routing association means acts to eliminate the first routing association responsive to instructions from at least one of: the first party, the first messaging station, the second messaging station, the first messaging response system, a third messaging station of the first messaging response system and a third party associated with the first messaging response system.

57. The session router of claim 36 wherein the routing association means acts to change the first routing association to associate the first party with a second messaging station, wherein subsequent messaging communications from the first party are prevented from being sent to the first messaging station and are instead sent to the second messaging station.

58. The session router of claim 57 wherein the routing association means acts to change the first routing association to associate the first party with a second messaging station responsive to instructions from at least one of: the first party, the first messaging station, the second messaging station, the first messaging response system, a third messaging station of the first messaging response system and a third party associated with the first messaging response system.

59. The session router of claim 36 wherein the session router acts to store, in relation to a communications session involving messaging communications between the first party and the first messaging response system, session information including at least one of: an identifier associated with the first party, state information related to the communications session with the first party, degree of progress through a programmatic sequence of steps performed by the first messaging response system, copies of at least portions of messaging communications, information obtained from the party, information requested by the party, information pertaining to the party, information obtained from a database responsive to communications with the party, information pertaining to the first messaging station, and pointers, links, handles, indices and other references to places where additional data can be obtained.

60. The session router of claim 59, wherein the session router further acts to associate a second messaging station with the first party, wherein messaging communications from the first party are sent to the second messaging station and wherein the second messaging station can access session information stored by the first messaging station.

61. The session router of claim 36, wherein the session router further acts in:
associating a second messaging station with the first party, wherein messaging communications from the first party are sent to the second messaging station; and
conveying, from the first messaging station to the second messaging station, session information pertaining to a communications session involving messaging communications between the first party and the first messaging response system, the session information including at least one of: an identifier associated with the first party, state information related to the communications session with the first party, degree of progress through a programmatic sequence of steps performed by the first messaging response system, copies of at least portions of messaging communications, information obtained from the party, information requested by the party, information pertaining to the party, information obtained from a database responsive to communications with the party, information pertaining to the first messaging station, and a reference to a place where data can be obtained.

62. The session router of claim 36, wherein the session router further acts in:
associating a second messaging response system, wherein messaging communications from the first party are sent to the second messaging response system; and
conveying, from the first messaging response system to the second messaging response system, session information pertaining to a communications session involving messaging communications between the first party and the first messaging response system, the session information including at least one of: an identifier associated with the first party, state information related to the communications session with the first party, degree of progress through a programmatic sequence of steps performed by the first messaging response system, copies of at least portions of messaging communications, information obtained from the party, information requested by the party, information pertaining to the party, information obtained from a database responsive to communications with the party, information pertaining to the first messaging station, and a reference to a place where data can be obtained.

63. A session router for managing instant messaging communications to a plurality of instant messaging stations, the session router comprising:
means for receiving a first instant messaging communication in text format from a first party;
means for associating a first instant messaging station with the first party, wherein the first instant messaging communications received from the first party are directed to the instant messaging station;
a translating and converting means for translating and converting the first instant messaging communications from a written language into a different spoken language to generate a corresponding first audio messaging communications in audio format to be transmitted to a second party based on language preferences stored in a first profile of the first party;
a receiver means for receiving a second audio messaging communications in audio format from the second party in replying to the first audio messaging communications at a messaging response system, wherein the translating and converting means translates and converts the second audio messaging communications from the spoken language into the written language to generate a corresponding second instant messaging communications in text format to be transmitted to the first party based on language preferences stored in a second profile of the second party; and
a billing system charging accounts of the first and the second parties fees for the translation and conversion services.

64. A service providing system for providing service to a first party via messaging communications and a messaging response system with the first party, the service providing system comprising:
- a messaging communications interface means for communicating via the messaging communications, wherein first messaging communications in text format from the first party are received by the service providing system;
- a first messaging station for performing a service responsive to the first messaging communications received from the first party;
- a session router means for selectively directing the first messaging communications from the first party to the first messaging station,
- a translator and converter means for translating and converting the first messaging communications from a written language into a different spoken language to generate a corresponding first audio messaging communications in audio format to be transmitted to a second party based on language preferences stored in a first profile of the first party;
- a means for receiving a second audio messaging communications in audio format from the second party in replying to the first audio messaging communications at the messaging response system, wherein the translator and converter means translates and converts the second audio messaging communications from the spoken language into the written language to generate a corresponding second messaging communications in text format to be transmitted to the first party based on language preferences stored in a second profile of the second party; and
- a billing system charging accounts of the first and the second parties fees for the translation and conversion services.

65. The service providing system of claim 64 further comprising a billing system interface for communicating, with the billing system, information about usage of the service providing system by the first party.

66. The service providing system of claim 65 wherein the information about usage of the service providing system comprises at least one of: an identifier associated with the first party, an identifier associated with the instant communications client used by the first party, an identity of an instant messaging service by which the first party communicates with the service providing system and an identifier by which the first party addresses communications to the service providing system.

67. The service providing system of claim 64 further comprising a billing function for determining billable usage of the service providing system by the first party.

68. The service providing system of claim 64 further comprising:
- means for determining whether payment can be obtained for usage charges pertaining to the billable usage, wherein the performing the service is selectively performed responsive at least to whether payment can be obtained for the usage charges.

69. The service providing system of claim 64 wherein the first messaging communications are addressed to the service providing system using a first identifier associated with the service providing system.

70. The service providing system of claim 69 wherein the session router means acts to selectively route second messaging communications from the second party to a second messaging station.

71. The service providing system of claim 70 wherein the second messaging communications from the second party are addressed to the service providing system using the same first identifier by which the first messaging communications are addressed to the service providing system.

72. The service providing system of claim 64 further comprising:
- routing association means to associate the first party with the first messaging station wherein communications from the first party are selectively routed to at least the first messaging station.

73. The service providing system of claim 64 further comprising:
- a communications network control interface means for coupling the service providing system to a communications network wherein the communications network establishes communications responsive to control communications with the service providing system via the communications network control interface.

74. The service providing system of claim 73 wherein the establishment of communications is responsive to at least one of: communications between the first party and the service providing system and a determination from a messaging station as to whether the first party is to engage in communications through the communications network.

75. The service providing system of claim 73 wherein the control communications with the service providing system via the communications network control interface cause the establishment of a telephone connection.

76. The service providing system of claim 73 wherein the communications network comprises at least one of: a telephone network, a private branch exchange, a virtual private network and a wireless communications network.

77. The service providing system of claim 64 wherein the communications network comprises a packet telephony gateway.

78. The service providing system of claim 77 wherein the communications network control interface is communicably coupled to the packet telephony gateway.

79. The service providing system of claim 78 wherein the packet telephony gateway is coupled to a telephone network and acts to establish a telephone connection involving the telephone network responsive to communications with the service providing system via the communications network control interface.

80. The service providing system of claim 78 wherein the packet telephony gateway is coupled to a data transport network and acts to establish a packet data stream involving the data transport network responsive to communications with the service providing system via the communications network control interface.

81. The service providing system of claim 78 wherein the packet telephony gateway is coupled to a data transport network and is operable, responsive to communications with the service providing system via the communications network control interface, to establish communications with a messaging service.

82. The service providing system of claim 78 wherein the packet telephony gateway is operable, responsive at least to communications with the service providing system via the communications network control interface, to establish communications with the instant communications client used by the first party.

83. The service providing system of claim 78 wherein the packet telephony gateway is operable, responsive at least to communications with the service providing system via the communications network control interface, to establish communications with a media translator for communicating with the instant communications client used by the first party and for performing at least one of:
- receiving textual information from the first party, translating the textual information into corresponding audio information, and providing corresponding audio information to the gateway, and
- receiving audio information from the gateway, translating the audio information into corresponding textual information, and providing the corresponding textual information to the first party.

84. The service providing system of claim 64 further comprising a messaging service associating means for associating the first party with a first messaging service wherein communications from the service providing system to the first party are routed to the first messaging service.

85. The service providing system of claim 84 wherein the messaging service associating means acts for associating a second party with a second messaging service wherein communications from the service providing system to the second party are routed to the second messaging service.

86. A method for providing a service to a first party via instant communications and a messaging response system, the method comprising:
- establishing first communications in text format with an instant communications client associated with the first party;
- responsive at least to the first communications, causing second communications to be established via a communications network;
- translating and converting the first communications from a written language into a different spoken language to generate a corresponding first audio messaging communications in audio format to be transmitted to a second party based on language preferences stored in a first profile of the first party;
- receiving a second audio messaging communications in audio format from the second party in replying to the first audio messaging communications at the messaging response system;
- translating and converting the second audio messaging communications from the spoken language into the written language to generate the second communications in text format to be transmitted to the first party based on language preferences stored in a second profile of the second party; and
- charging accounts of the first and the second parties fees for the translation and conversion services.

87. The method of claim 86 further comprising:
indicating, to the billing system, activity pertaining to the causing the second communications to be established.

88. The method of claim 86 further comprising:
determining billable usage of the system related to the causing the second communications to be established.

89. The method of claim 88 further comprising:
determining whether payment can be obtained for usage charges pertaining to the billable usage; and
selectively performing the causing the second communications to be established responsive at least to whether payment can be obtained for the usage charges.

90. The method of claim 86 wherein said second communications comprises a voice-over-packet communications session.

91. The method of claim 86 wherein said second communications comprises communications between the first party and the second party via the communications network.

92. The method of claim 86 wherein said second communications comprises communications between the instant communications client associated with the first party and a second party via the communications network.

93. The method of claim 86 wherein said second communications is established responsive to indication in the first communications that the first party desires to establish the second communications.

94. The method of claim 86 wherein the communications network comprises a gateway.

95. The method of claim 94 wherein the second communications comprises establishing communications through the gateway.

96. The method of claim 94 wherein the gateway establishes a telephony connection responsive to the first communications.

97. The method of claim 94 wherein the gateway acts to establish communications with a second party coupled to the gateway via telephone connection.

98. The method of claim 94 wherein the gateway acts to establish communications with the instant communications client associated with the first party.

99. The method of claim 94 wherein the gateway acts to establish communications responsive to indication in the first communications that the first party desires to establish the second communications.

100. The method of claim 94 wherein said second communications comprises communications between the instant communications client and a media translator performing at least one of:
- receiving textual information from the first party, translating the textual information into corresponding audio information, and providing corresponding audio information to the gateway, and
- receiving audio information from the gateway, translating the audio information into corresponding textual information, and providing the corresponding textual information to the first party.

101. The method of claim 100 further comprising:
indicating, to the billing system, activity pertaining to the communications with the media translator.

102. The method of claim 94 wherein the gateway acts to establish communications with a media translator for performing at least one of:
- receiving textual information from the first party, translating the textual information into corresponding audio information, and providing the corresponding audio information to the gateway, and
- receiving audio information from the gateway, translating the audio information into corresponding textual information, and providing the corresponding textual information to the first party.

103. The method of claim 102 further comprising:
indicating, to the billing system, activity pertaining to the communications with the media translator.

104. The method of claim 94 further comprising:
communicating to the gateway contact information corresponding to the instant communications client, wherein the gateway acts to establish communications selectively with the instant communications client responsive to the contact information.

105. The method of claim 86 wherein said second communications comprises establishing voice communications between the instant communications client and the second party.

106. The method of claim 105 further comprising:
indicating, to the billing system, activity pertaining to the establishing voice communications between the instant communications client and the second party.

107. The method of claim 105 wherein the second party is coupled to the communications network using a packet telephony client.

108. The method of claim 105 wherein said voice communications comprises a voice-over-packet communications session.

109. The method of claim 86 wherein said second communications comprises establishing communications between a second party and a media translator for performing at least one of:
receiving textual information from the first party, translating the textual information into corresponding audio information, and providing corresponding audio information to the second party, and
receiving audio information from the second party, translating the audio information into corresponding textual information, and providing the corresponding textual information to the first party.

110. The method of claim 109 further comprising:
indicating, to the billing system, activity pertaining to the engaging the media translator.

111. The method of claim 86 further comprising:
an identifier associated with the party, an identifier associated with the instant communications client used by the party and an identity of an instant messaging service through which the instant communications client is communicating.

112. A service providing system for providing service to a first party via messaging communications and a messaging response system with the first party, the first party being coupled to a messaging system, the service providing system comprising:
a messaging system interface means for communicating with the messaging system, wherein first messaging communications in text format from the first party are received by the service providing system;
a first messaging station for performing an action responsive to the first messaging communications received from the first party;
a communications network control interface means for coupling the service providing system to a communications network wherein the service providing system causes the communications network to establish communications;
a translator and converter means for translating and converting the first messaging communications from a written language into a different spoken language to generate a corresponding first audio messaging communications in audio format to be transmitted to a second party based on language preferences stored in a first profile of the first party;
a means for receiving a second audio messaging communications in audio format from the second party in replying to the first audio messaging communications at the messaging response system, wherein the translator and converter means translates and converts the second audio messaging communications from the spoken language into the written language to generate a corresponding second messaging communications in text format to be transmitted to the first party based on language preferences stored in a second profile of the second party; and
a billing system charging accounts of the first and the second parties fees for the translation and conversion services.

113. The service providing system of claim 112 further comprising a billing system interface for communicating, with the billing system, information about usage of the communication system by at least one of the first party and the second party.

114. The service providing system of claim 112 further comprising a billing function for determining billable usage of the communication system related to communications between the first party and the second party.

115. The service providing system of claim 114 further comprising:
means for determining whether payment can be obtained for usage charges pertaining to the billable usage, wherein the establishing communications between the telephone and the instant communications client is selectively performed responsive at least to whether payment can be obtained for the usage charges.

116. The service providing system of claim 112 wherein said causing the communications network to establish communications is responsive at least to the first messaging communications.

117. The service providing system of claim 112 wherein said causing the communications network to establish communications is responsive to the messaging station determining whether communications should be established responsive at least to the first messaging communications.

118. A non-transitory computer-readable medium comprising instructions which, when executed by a processor, cause a communication system to perform a method for managing messaging communications among a plurality of parties and a messaging response system, the message response system comprising a plurality of messaging stations, the method comprising:
receiving first messaging communications in text format at the messaging response system;
identifying a first party as having originated the first messaging communications;
selectively routing the first messaging communications to a particular first messaging station based upon the identity of the first party;
translating and converting the first messaging communications from a written language into a different spoken language to generate a corresponding first audio messaging communications in audio format to be transmitted to a second party based on language preferences stored in a first profile of the first party;
receiving a second audio messaging communications in audio format from the second party in replying to the first audio messaging communications at the messaging response system;
translating and converting the second audio messaging communications from the spoken language into the written language to generate a corresponding second messaging communications in text format to be transmitted to the first party based on language preferences stored in a second profile of the second party; and
charging accounts of the first and the second parties fees for the translation and conversion services.

119. The non-transitory computer-readable medium of claim 118 wherein the method further comprises:
maintaining a first routing association involving the identity of the first party and the first messaging station, wherein the routing association represents that messaging communications from the first party are to be routed to the first messaging station.

120. The non-transitory computer-readable medium of claim 119 wherein the first routing association acts by associating the first messaging station with a first party identifier from a group including: a screen name by which the first party is known in an instant messaging system, a network address for an instant communications client used by the first party, an account name, an account number, and a user name by which the first party is known to the messaging response system.

121. The non-transitory computer-readable medium of claim 119 wherein the method further comprises the step of:
establishing a second routing association associating the first party with a second messaging station, wherein messaging communications from the first party are sent to the second messaging station.

122. The non-transitory computer-readable medium of claim 121 wherein said establishing the second routing association is responsive to instructions from at least one of: the first party, the first messaging station, the second messaging station and the messaging response system.

123. The non-transitory computer-readable medium of claim 121 wherein the method further comprises the step of:
eliminating the first routing association wherein subsequent messaging communications from the first party are prevented from being sent to the first messaging station.

124. The non-transitory computer-readable medium of claim 123 wherein the eliminating the first routing association is responsive to instructions from at least one of: the first party, the first messaging station, the second messaging station and the messaging response system.

125. The non-transitory computer-readable medium of claim 119 wherein the method further comprises the step of:
changing the first routing association to associate the first party with a second messaging station, wherein subsequent messaging communications from the first party are prevented from being sent to the first messaging station and are instead sent to the second messaging station.

126. The non-transitory computer-readable medium of claim 125 wherein said changing the first routing association is responsive to instructions from one of the first party, the first messaging station, the second messaging station and the messaging response system.

127. The non-transitory computer-readable medium of claim 118 wherein the method further comprises:
establishing a first routing association between the first party and a first messaging station,
wherein the establishment of the first routing association is performed upon the receiving of the first messaging communications from the first party by the messaging response system.

128. The non-transitory computer-readable medium of claim 127 wherein the first routing association indicates the first messaging station being associated with a first party identifier from a group including: a screen name by which the first party is known in an instant messaging system, a network address for the instant communications client used by the first party, an account name, an account number, a user name by which the first party is known to the messaging response system.

129. The non-transitory computer-readable medium of claim 127 wherein the method further comprises:
selecting the first messaging station to be associated with the first party responsive to at least one of: availability of the first messaging station, activity level of the first messaging station, suitability of the first messaging station to communicate with the first party, resources available to the first messaging station, capabilities of the first messaging station, prearranged association of the first messaging station with the first party, and an attribute of the first party meeting criteria to be handled by the first messaging station.

130. The non-transitory computer-readable medium of claim 118 wherein the first party addresses the messaging communications to the messaging response system using a first identifier associated with the messaging response system.

131. The non-transitory computer-readable medium of claim 130 wherein the first identifier is a screen name used as an identifier in a public instant messaging service.

132. The non-transitory computer-readable medium of claim 130 wherein the method further comprises:
routing a second messaging communications from the first messaging station to the first party, wherein a sender identifier associated with the second messaging communications and indicated to the first party as the source of the second messaging communications is the same as the first identifier associated with the messaging response system.

133. The non-transitory computer-readable medium of claim 130 wherein the method further comprises:
receiving, at the messaging response system, second messaging communications from the second party;
establishing a second routing association between the second party and a second messaging station; and
responsive to the second routing association, routing the second messaging communications from the second party to the second messaging station.

134. The non-transitory computer-readable medium of claim 133 wherein the second party addresses the second messaging communications to the messaging response system using the first identifier associated with the messaging response system.

135. The non-transitory computer-readable medium of claim 134 wherein messaging communications received by the second party from the second messaging station system sender name is the same as the first identifier associated with the messaging response system.

136. The non-transitory computer-readable medium of claim 133 wherein the messaging communications from the first party is received at the messaging response system from a first messaging service and messaging communications from the first station in response to the first party are forwarded to the first messaging service for sending to the first party.

137. The non-transitory computer-readable medium of claim 136 wherein the messaging communications from the second party is received at the messaging response system from a second messaging service coupled to the service provider system and messaging communications from the second station in response to the second party are forwarded to the second messaging service for sending to the second party.

138. The non-transitory computer-readable medium of claim 130 further comprising:
receiving second messaging communications from the first party addressed to a second identifier;
determining whether the first identifier and second identifier are commonly associated with the messaging response system; and
providing the first identifier to the first party responsive to whether the first identifier and second identifier are commonly associated with the messaging response system.

139. The non-transitory computer-readable medium of claim 138 wherein the selectively routing the first messaging communications to a particular first messaging station is responsive to at least one of the first identifier and the second identifier.

140. The non-transitory computer-readable medium of claim 130 wherein the selectively routing the first messaging communications to a particular first messaging station is responsive at least to the first identifier.

141. The non-transitory computer-readable medium of claim 140 wherein the first identifier is a screen name used as an identifier in an instant messaging service.

142. The non-transitory computer-readable medium of claim 140 further comprising:
  maintaining a first routing association involving the identity of the first party and the first identifier and the first messaging station, wherein the routing association represents that messaging communications from the first party addressed to the first identifier are to be routed to the first messaging station.

143. The non-transitory computer-readable medium of claim 142 further comprising:
  receiving second messaging communications from the first party addressed to a second identifier associated with the message response system; and
  selectively routing the second messaging communications to a second messaging station.

144. The non-transitory computer-readable medium of claim 118 wherein the messaging response system includes a human-operated messaging station and an automatic messaging station for automatically handling messaging communications.

145. The non-transitory computer-readable medium of claim 118 wherein the method further comprises the step of:
  eliminating the first routing association wherein subsequent messaging communications from the first party are prevented from being sent to the first messaging station.

146. The non-transitory computer-readable medium of claim 145 wherein said eliminating the first routing association is responsive to instructions from at least one of: the first party, the first messaging station, a second messaging station and the messaging response system.

147. The non-transitory computer-readable medium of claim 118 wherein the method further comprises:
  in relation to a communications session involving messaging communications between the first party and the messaging response system, storing session information including at least one of: an identifier associated with the first party, state information related to the communications session with the first party, degree of progress through a programmatic sequence of steps performed by the messaging response system,
copies of at least portions of messaging communications, information obtained from the party, information requested by the party, information pertaining to the party, information obtained from a database responsive to communications with the party, information pertaining to the first messaging station, and pointers, links, handles, indices and other references to places where additional data can be obtained.

148. The non-transitory computer-readable medium of claim 147 wherein the method further comprises the steps of:
  associating a second messaging station with the first party, wherein messaging communications from the first party are sent to the second messaging station; and
  accessing, by the second messaging station, session information stored by the first messaging station.

149. The non-transitory computer-readable medium of claim 118 wherein the method further comprises the steps of:
  associating a second messaging station with the first party, wherein messaging communications from the first party are sent to the second messaging station; and
  conveying, from the first messaging station to the second messaging station, session information pertaining to a communications session involving messaging communications between the first party and the messaging response system, the session information including at least one of: an identifier associated with the first party, state information related to the communications session with the first party, degree of progress through a programmatic sequence of steps performed by the messaging response system, copies of at least portions of messaging communications, information obtained from the party, information requested by the party, information pertaining to the party, information obtained from a database responsive to communications with the party, information pertaining to the first messaging station, and a reference to a place where data can be obtained.

150. The non-transitory computer-readable medium of claim 118 wherein the method further comprises:
  indicating, to the billing system, activity pertaining to the selectively routing of the first messaging communications to the first messaging station.

151. The non-transitory computer-readable medium of claim 118 wherein the method further comprises:
  providing to a billing function at least one of: an identifier associated with the first party, an identifier associated with an instant communications client used by the first party, an identity of an instant messaging service by which the first party communicates with the messaging response system and an identifier by which the first party addresses communications to the messaging response system.

152. A non-transitory computer-readable medium comprising instructions which, when executed by a processor, cause a service providing system to perform a method for providing service to a first party via messaging communications and a messaging response system, the first party using an instant communications client, the method comprising the steps of:
  establishing first communications in text format with an instant communications client associated with the first party;
  responsive at least to the first communications, causing second communications to be established via a communications network;
  translating and converting the first communications from a written language into a different spoken language to generate a corresponding first audio messaging communications in audio format to be transmitted to a second party based on language preferences stored in a first profile of the first party;
  receiving a second audio messaging communications in audio format from the second party in replying to the first audio messaging communications at the messaging response system;
  translating and converting the second audio messaging communications from the spoken language into the written language to generate the second communications in text format to be transmitted to the first party based on language preferences stored in a second profile of the second party; and
  charging accounts of the first and the second parties fees for the translation and conversion services.

153. The non-transitory computer-readable medium of claim 152 wherein said second communications established via the communications network comprises a voice-over-packet communications session.

154. The non-transitory computer-readable medium of claim 152 wherein said second communications established via the communications network comprises communications between the first party and the second party via the communications network.

155. The non-transitory computer-readable medium of claim 152 wherein said second communications established via the communications network comprises communications between the instant communications client used by the first party and the second party via the communications network.

156. The non-transitory computer-readable medium of claim 152 wherein said second communications established via the communications network is responsive to the first party indicating to the service providing system a desire to establish communications.

157. The non-transitory computer-readable medium of claim 152 wherein the communications network comprises a gateway.

158. The non-transitory computer-readable medium of claim 157 wherein said causing second communications to be established via the communications network comprises establishing communications through the gateway.

159. The non-transitory computer-readable medium of claim 157 wherein the service providing system is operably coupled to the gateway.

160. The non-transitory computer-readable medium of claim 157 wherein the gateway establishes a telephony connection responsive to the messaging communications.

161. The non-transitory computer-readable medium of claim 157 wherein the gateway acts to establish communications with a second party coupled to the gateway via telephone connection.

162. The non-transitory computer-readable medium of claim 157 wherein the gateway acts to establish communications with the instant communications client.

163. The non-transitory computer-readable medium of claim 162 wherein the gateway acts to establish communications responsive to the first party indicating to the service providing system a desire to establish communications.

164. The non-transitory computer-readable medium of claim 157 wherein said second communications established via said communications network comprises communications between the instant communications client and a media translator for performing at least one of:
receiving textual information from the first party, translating the textual information into corresponding audio information, and providing corresponding audio information to the gateway; and
receiving audio information from the gateway, translating the audio information into corresponding textual information, and provide the corresponding textual information to the first party.

165. The non-transitory computer-readable medium of claim 157 wherein the gateway acts to establish communications with a media translator for performing at least one of:
receiving textual information from the first party, translating the textual information into corresponding audio information, and providing corresponding audio information to the gateway; and
receiving audio information from the gateway, translating the audio information into corresponding textual information, and provide the corresponding textual information to the first party.

166. The non-transitory computer-readable medium of claim 157 wherein the service providing system communicates to the gateway contact information corresponding to the instant communications client and the gateway acts to establish communications selectively with the instant communications client responsive to the contact information.

167. The non-transitory computer-readable medium of claim 152 wherein said causing second communications to be established via the communications network comprises establishing voice communications between the real-time client and a second party.

168. The non-transitory computer-readable medium of claim 167 wherein the second party is coupled to the communications network using an internet-protocol telephony client.

169. The non-transitory computer-readable medium of claim 167 wherein said voice communications comprises a voice-over-packet communications session.

170. The non-transitory computer-readable medium of claim 152 wherein said second communications established via said network comprises establishing communications between the second party and a media translator for performing at least one of:
receiving textual information from the first party, translating the textual information into corresponding audio information, and providing corresponding audio information to the second party; and
receiving audio information from the second party, translating the audio information into corresponding textual information, and providing the corresponding textual information to the first party.

171. The non-transitory computer-readable medium of claim 152 wherein the method further comprises:
indicating, to the billing system, activity pertaining to the causing the second communications to be established.

172. The non-transitory computer-readable medium of claim 152 wherein the method further comprises:
determining billable usage of the system related to the causing the second communications to be established.

173. The non-transitory computer-readable medium of claim 172 wherein the method further comprises:
determining whether payment can be obtained for usage charges pertaining to the billable usage; and
selectively performing the causing the second communications to be established responsive at least to whether payment can be obtained for the usage charges.

174. The non-transitory computer-readable medium of claim 152 wherein the method further comprises:
providing to a billing function at least one of: an identifier associated with the first party, an identifier associated with the instant communications client used by the first party and an identity of an instant messaging service by which the instant communications client is communicating.

175. A system for providing a service to a first party via instant communications and a messaging response system, the system comprising:
means for establishing first communications with an instant communications client associated with the first party;
means for causing, responsive at least to the first communications, second communications to be established via a communications network;
means for translating and converting the first communications from a written language into a different spoken language to generate a corresponding first audio messaging communications in audio format to be transmitted to a second party based on language preferences stored in a first profile of the first party;

means for receiving a second audio messaging communications in audio format from the second party in replying to the first audio messaging communications at the messaging response system;

means for translating and converting the second audio messaging communications from the spoken language into the written language to generate the second communications in text format to be transmitted to the first party based on language preferences stored in a second profile of the second party; and means for charging accounts of the first and the second parties fees for the translation and conversion services.

176. The system of claim 175 wherein said means for causing second communications to be established comprises means for establishing a voice-over-packet communications session.

177. The system of claim 175 wherein said means for causing second communications to be established comprises means for establishing communications between the first party and the second party via the communications network.

178. The system of claim 175 wherein said means for causing second communications to be established comprises means for establishing communications between the instant communications client associated with the first party and the second party via the communications network.

179. The system of claim 175 wherein said second communications is established responsive to indication in the first communications that the first party desires to establish the second communications.

180. The system of claim 175 wherein the communications network comprises a gateway.

181. The system of claim 180 wherein said second communications comprises establishing communications through the gateway.

182. The system of claim 180 wherein said means for causing second communications to be established comprises means for causing the gateway to establish a telephony connection responsive to the first communications.

183. The system of claim 180 wherein the gateway acts to establish communications with the second party coupled to the gateway via telephone connection.

184. The system of claim 180 wherein the gateway acts to establish communications with the instant communications client associated with the first party.

185. The system of claim 180 wherein the gateway acts to establish communications responsive to indication in the first communications that the first party desires to establish the second communications.

186. The system of claim 180 wherein said means for causing second communications to be established comprises means for establishing communications between the instant communications client and a media translator performing at least one of:

receiving textual information from the first party, translating the textual information into corresponding audio information, and providing the corresponding audio information to the gateway; and receiving audio information from the gateway, translating the audio information into corresponding textual information, and providing the corresponding textual information to the first party.

187. The system of claim 180 wherein the gateway acts to establish communications with a media translator for performing at least one of:

receiving textual information from the first party, translating the textual information into corresponding audio information, and providing corresponding audio information to the gateway; and receiving audio information from the gateway, translating the audio information into corresponding textual information, and providing the corresponding textual information to the first party.

188. The system of claim 180 further comprising:

means for communicating to the gateway contact information corresponding to the instant communications client, wherein the gateway acts to establish communications selectively with the instant communications client responsive to the contact information.

189. The system of claim 175 wherein said means for causing second communications to be established comprises means for establishing voice communications between the instant communications client and the second party.

190. The system of claim 189 wherein the second party is coupled to the communications network using an internet-protocol telephony client.

191. The system of claim 189 wherein said voice communications comprises a voice-over-packet communications session.

192. The system of claim 175 wherein said means for causing second communications to be established comprises means for establishing communications between the second party and a media translator for performing at least one of:

receiving textual information from the first party, translating the textual information into corresponding audio information, and providing corresponding audio information to the second party; and receiving audio information from the second party, translating the audio information into corresponding textual information, and providing the corresponding textual information to the first party.

193. In a service providing system, a method of providing service to a first party via messaging communications and a messaging response system comprising the steps of:

at the service providing platform, receiving a first messaging communication in text format from the first party, wherein the first messaging communication is addressed to an instant communications screen name associated with the service providing system;

responsive at least to the receiving the first messaging communication from the first party, establishing a communications session wherein at least one participant communicates without having to compose discrete messages;

translating and converting the first messaging communications from a written language into a different spoken language to generate a corresponding first audio messaging communications in audio format to be transmitted to the at least one participant based on language preferences stored in a first profile of the first party;

receiving a second audio messaging communications in audio format from the at least one participant in replying to the first audio messaging communications;

translating and converting the second audio messaging communications from the spoken language into the written language to generate a corresponding second messaging communications in text format to be transmitted to the first party based on language preferences stored in a second profile of the at least one participant; and charging accounts of the first and the at least one participant fees for the translation and conversion services.

194. The method of claim 193 wherein the first messaging communication is composed by the first party in human-readable natural language form.

195. A method of providing a service to a party via messaging communications and a messaging response system, comprising the steps of:
  providing a user interface element which can be activated by the party;
  responsive to the activating of the user interface element, effecting instant communications in text format between the party and the messaging response system via a first communications session;
  wherein, responsive to the instant communications, the messaging response system establishes a second communications session wherein at least one participant communicates without having to compose discrete messages;
  translating and converting the instant communications from a written language into a different spoken language to generate a corresponding first audio messaging communications in audio format to be transmitted to the at least one participant based on language preferences stored in a first profile of the party;
  receiving a second audio messaging communications in audio format from the at least one participant in replying to the first audio messaging communications at the messaging response system;
  translating and converting the second audio messaging communications from the spoken language into the written language to generate another instant communications in text format to be transmitted to the party based on language preferences stored in a second profile of the at least one participant; and
  charging accounts of the party and the at least one participant fees for the translation and conversion services.

196. The method of claim 195 wherein the second communications session involves the party.

197. The method of claim 195 wherein the discrete messages are instant messaging communications.

* * * * *